United States Patent
Unnikrishnan et al.

(10) Patent No.: US 12,469,068 B2
(45) Date of Patent: Nov. 11, 2025

(54) SEARCH RESULTS SUMMARIZATION TUNING

(71) Applicant: ADOBE INC., San Jose, CA (US)

(72) Inventors: Soumya Unnikrishnan, Austin, TX (US); Saina Lajevardi, Austin, TX (US); Michele Saad, Austin, TX (US)

(73) Assignee: ADOBE INC., San Jose, CA (US)

( * ) Notice: Subject to any disclaimer, the term of this patent is extended or adjusted under 35 U.S.C. 154(b) by 153 days.

(21) Appl. No.: 18/545,452

(22) Filed: Dec. 19, 2023

(65) Prior Publication Data
US 2025/0200635 A1 Jun. 19, 2025

(51) Int. Cl.
*G06Q 30/0601* (2023.01)
*G06F 40/247* (2020.01)
*G06F 40/40* (2020.01)
*G06Q 30/0204* (2023.01)

(52) U.S. Cl.
CPC ....... *G06Q 30/0631* (2013.01); *G06F 40/247* (2020.01); *G06F 40/40* (2020.01); *G06Q 30/0204* (2013.01); *G06Q 30/0629* (2013.01)

(58) Field of Classification Search
CPC .......... G06Q 30/0631; G06Q 30/0204; G06Q 30/0629; G06F 40/247; G06F 40/40
See application file for complete search history.

(56) References Cited

U.S. PATENT DOCUMENTS

| | | | |
|---|---|---|---|
| 10,296,540 B1* | 5/2019 | Bhole | G06F 16/9535 |
| 2020/0019419 A1* | 1/2020 | Yada | G06V 10/776 |
| 2020/0142978 A1* | 5/2020 | Salokhe | G06F 18/24 |
| 2020/0349214 A1* | 11/2020 | Tang | G06F 16/953 |
| 2021/0110464 A1* | 4/2021 | Tufegdzic | G06V 10/751 |

OTHER PUBLICATIONS

Brown, et al, "Language Models are Few-Shot Learners", arXiv preprint: arXiv:2005.14165v4 [cs.CL] Jul. 22, 2020, 75 pages.
Manning, "Human Language Understanding & Reasoning", Daedalus (2022) 151 (2): 127-138, May 1, 2022, 12 pages.
Nan, et al, "Improving Factual Consistency of Abstractive Summarization via Question Answering", arXiv preprint: arXiv:2105.04623v1 [cs.CL] May 10, 2021, 16 pages.

* cited by examiner

*Primary Examiner* — Abul K Azad
(74) *Attorney, Agent, or Firm* — F. CHAU & ASSOCIATES, LLC

(57) ABSTRACT

One or more aspects of the method, apparatus, and non-transitory computer readable medium include receiving a query relating to an item and a summarization type indicating an emphasis on item similarities or item differences, obtaining, using a search component, descriptions of items relevant to the query, generating input data for a machine learning model based on the descriptions and the summarization type, and generating, using the machine learning model, a summarization of the descriptions based on the input data in response to the query, wherein the summarization emphasizes the item similarities or item differences based on the summarization type.

20 Claims, 12 Drawing Sheets

SEARCH RESULTS SUMMARIZATION TUNING

BACKGROUND

The present disclosure relates to summarization of search results relating to a user query, and the generation of ideation questions.

Large language models (LLMs) process text data to learn to predict output text from text input. The LLMs can be artificial neural networks including tens of millions, and up to billions, of weights used to calculate a probability of a next word or token for output. Natural language processing (NLP) has shifted from learning task-specific representations and designing task-specific architectures to using task-agnostic pre-training and task-agnostic architectures.

Words and sentences can be represented by a position in a vector space, that can have several hundred to a thousand or more dimensions with real values, where similarities of meaning or syntax can be represented by the proximity in the vector space between words. The language models can generalize to words or phrases with similar meanings because these models can utilize proximity in this vector space for prediction in question answering and text classification. The models can learn an enormous amount of language and vocabulary by being exposed to an extremely large quantity of text in training.

SUMMARY

Embodiments of the present disclosure provide a machine learning model (MLM) utilizing natural language processing to analyze a user query and identify an item relating to the user preferences based on the query. A better understanding of the underlying details of the items (e.g., products) including their various feature sets, their usability differences, pricing, among other use case specific attributes can be obtained using a trained neural network.

A method, apparatus, and non-transitory computer readable medium for neural compositing are described. One or more aspects of the method, apparatus, and non-transitory computer readable medium include receiving a query relating to an item and a summarization type indicating an emphasis on item similarities or item differences, obtaining, using a search component, descriptions of items relevant to the query, generating input data for a machine learning model based on the descriptions and the summarization type, and generating, using the machine learning model, a summarization of the descriptions based on the input data in response to the query, wherein the summarization emphasizes the item similarities or item differences based on the summarization type.

An apparatus and method for neural compositing are described. One or more aspects of the apparatus and method include receiving a ranked list of items from a search component as a result of an initial search query, presenting a plurality of ideation questions generated by a machine learning model to a user, wherein the plurality of ideation questions are generated based on the ranked list of items and the initial search query, and conducting, using a search component, a subsequent search using a new query generated by the machine learning model based on responses provided by the user to the generated ideation questions.

An apparatus and method for neural compositing are described. One or more aspects of the apparatus and method include one or more processors, one or more memories including instructions executable by the one or more processors to receive an initial search query relating to an item and a summarization type indicating an emphasis on item similarities or item differences, obtaining, using a search component, a ranked list of items, as a result of the initial search query, generate, using a machine learning model, a comparative summarization of descriptions for the ranked list of items based on the summarization type, and present the comparative summarization and a plurality of generated ideation questions to a user, wherein the plurality of ideation questions are generated by an ideation component based on the ranked list of items and the initial search query.

DETAILED DESCRIPTION

Figure 1:
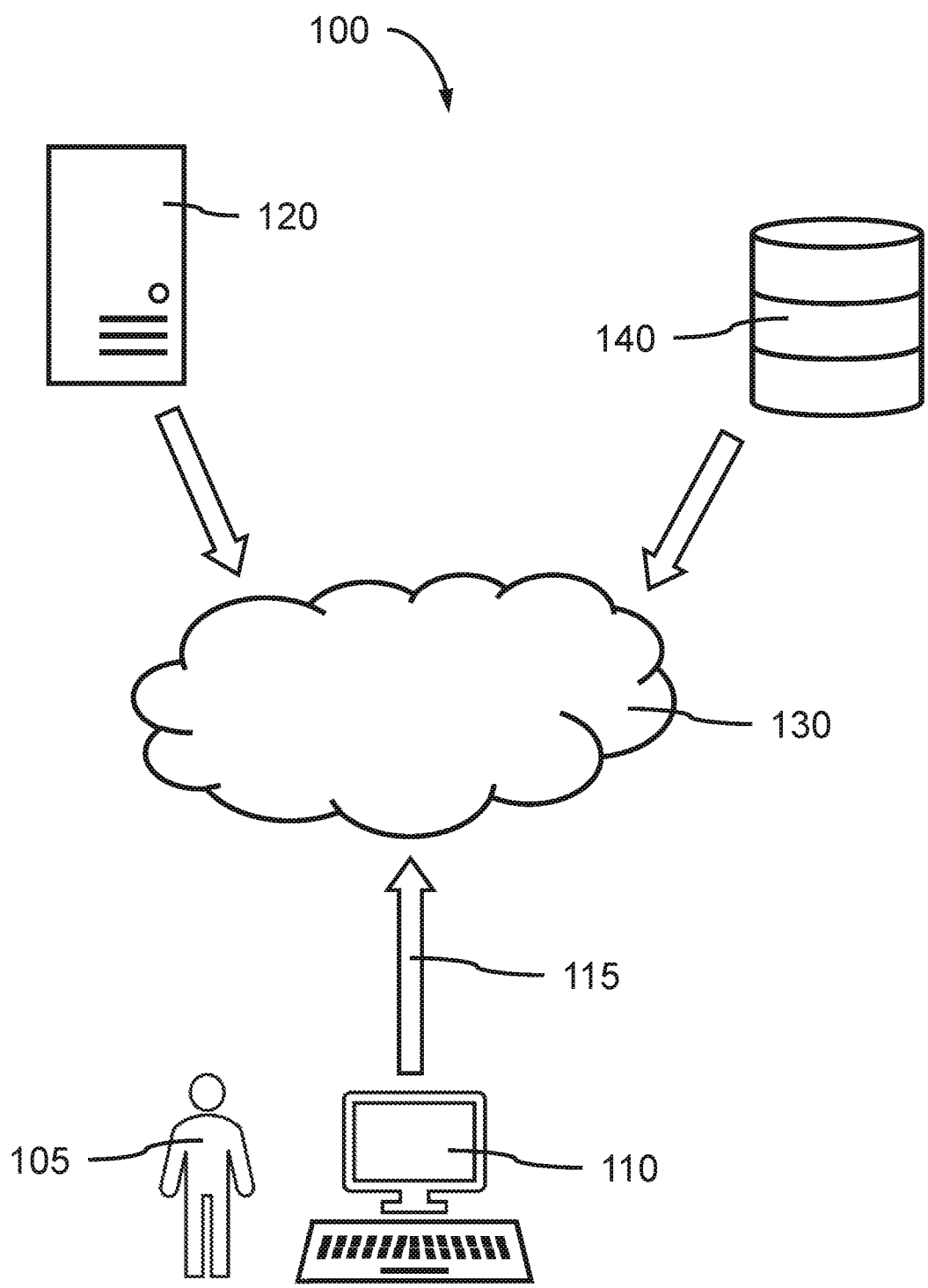
FIG. 1 is an illustrative depiction of a high-level diagram of users interacting with a summarization system, including a neural network for receiving and analyzing user queries from remote devices, according to aspects of the present disclosure.

The present disclosure relates to identifying relevant items based on a query from a user, where the query is used for an item search. Understanding the accurate intention behind a user's query is at the heart of search engines and information retrieval. Analysis and refinement of the user query can improve the user's search experience and increase the user's engagement online. Information is gained via an optimized LLM based ideation system, where new ideas are generated, and these new ideas prompt the user for additional input regarding the query and the user's intention, as part of an iterative process.

In various embodiments, in the context of item research, the significance of query intention becomes even more pronounced, as the effective presentation of desired items holds the key to driving revenue. A specific summarization of search results for item research, that employs an iterative approach, can result in summarization refinement, where information is gained via questions from an optimized LLM based ideation system. The LLM based ideation system, where new ideas are generated, prompts the user for additional input through questions. Being able to find a particular item of user interest described by an input query in an item search can enhance user experience and increase user engagement.

According to some aspects, the summarization system includes a summarizer having a summarization component, a search component, a large language model, and a training component. According to some aspects, the summarization component summarizes search results obtained by the search component. In some cases, the search results are based on a search query. In some cases, the search query is in a natural language format interpretable by the large language model.

Users searching and browsing online are presented with many options at the onset of the search result presentation page. Often, users searching online may have to dig deeper into each of the ranked search results. In particular, users browsing online stores must dig deeper into each of the ranked products presented to them to better understand the underlying details of the products, including their various feature sets, their usability differences, and pricing, among other use case specific attributes. Various information that can affect a user's decision-making, for example, design aspects and usability differences are buried in various sources. Not only do users need to understand what they are presented with, but they also form a mental map of how these products compare and relate to each other. This search process is cognitively loaded, which means users never get to the stage of understanding each retrieved search result or obtain a proper assessment of the results presented to them.

A method for item summarization is described. One or more aspects of the method include a summarization of search results that employs an approach to summarization that is iterative and results in summarization refinement utilizing information gained via an optimized machine learning-based ideation system that prompts the user for additional input. One or more aspects of the method further include an emphasis on captivating users' attention through thoughtfully designed procedures and strategies that leverage a variety of data sources. The strategic arrangement of items and presenting their features not only enhances the user experience, but also elevates the likelihood of successful conversations.

In various embodiments a transformer encoder-decoder architecture can be trained and used to prepare an item summarization based on an input query from a user. A machine learning model can be utilized to identify item features that are relevant to the user query, and prepare a summarization based on input data generated from item descriptions and a summarization type.

One or more aspects of the apparatus and method further include the ability to tune the summarization results, generate themes, use tuned parameters, apply merchant key performance indicators (KPI) to a summarization, infuse external information to aid the user, and further inform the searches.

Some examples of the method, apparatus, non-transitory computer readable medium, and system further include one or more processors, one or more memories including instructions executable by the one or more processors to receiving a ranked list of items from a search component as a result of an initial search query, presenting a plurality of generated ideation questions to a user, wherein the plurality of ideation questions are generated based on the ranked list of items, and conducting a subsequent search using a new query generated based on the responses provided by the user to the generated ideation questions.

Accordingly, embodiments of the disclosure improve on a user's online searching experience and provide more efficient online searching by refining the user search query based on the user's own intentions. The efficiency is improved by prompting the user to identify additional details and qualities for the search in a more-timely manner than the user alone may arrive at. The approach presented here provides a more refined understanding of the user's precise need for an item. This also allows high-quality queries for online searching for information, which can increase customer engagement and spending.

As used herein, the term "query" refers to a request for information. The request includes a question, a command, a set of keywords, a search term, and/or criteria. In some cases, a query includes a text-based query, a voice query, or a command to computer programs. In some cases, the information is requested by a user.

As used herein, the term "item" refers to a document, article, product, service, location, enterprise, or other object or entity that may be the subject of an online search. In some cases, a document-type item includes text-based documents, spreadsheets, presentations, images, PDFs, HTML Web pages, books, legal documents, and records. In some cases, a product-type item refers to an article of manufacture. In some cases, a document includes a snippet or a portion of the text of the document. In some cases, a service-type item refers to performance of work that is offered to another.

As used herein, the term "product information" or "item information" refers to written, printed, or electronically recorded descriptions, content, or data about a specific item.

As used herein, the term "input data" is an electronic representation of information, such as words, numbers, sentences, and images, formatted for use by a machine learning model to generate output, where the electronic representation incorporates information of one or more types from one or more sources. The "input data" can include encoded semantic meaning, relationships, and context of the words, sentences, documents, and/or images, where the encoding can be processed by a machine learning model.

As used herein, the term "tuning" refers to changing a feature in a manner that makes it more similar to an optimal result.

As used herein, the term "ranked list" refers to a plurality of items in an ordered sequence, where the order specifies a relative standing or relationship compared to an objective reference.

Network Architecture

One or more aspects of the apparatus and method include one or more processors; a memory coupled to and in communication with the one or more processors, wherein the memory includes instructions executable by the one or more processors to perform operations including: receiving a query from a user through a user's device, analyzing the query using a large language model, conducting an online search based on the analyzed query, generating questions about the search, refining the search based on the users responses to the generated questions, and presenting summarized search results to the user. The process is an iterative process alternating between presenting summarized search results to the user and refining the search based on the users responses to the generated questions.

In various embodiments, a transformer encoder-decoder architecture can be used to analyze the user query, summarize the search results, and generate questions for the user about the search based on an input query and the search results, where the transformer encoder-decoder architecture can be a large language model architecture.

FIG. 1 is an illustrative depiction of a high-level diagram of users interacting with a summarization system, including a neural network for receiving and analyzing user queries from remote devices, according to aspects of the present disclosure.

In various embodiments, a summarization system 120 can involve a user 105 who can interact with summarization system software on a user device 110. A user 105 interacts with the summarization system 120 using, for example, a desktop computer, a laptop computer, a handheld mobile device, for example, a smart phone, a tablet, a smart tv, an automatic speech recognition terminal, a smart hub, or other suitably configured user device. The user device 110 can communicate 115 with the summarization system 120, which can be a server located on the cloud 130. The summarization system 120 can generate item lists and summaries in response to a user query, where the user requests identification of an item having particular characteristics and features.

Embodiments of the disclosure can be implemented in a server operating from the cloud 130, where the cloud 130 is a computer network configured to provide on-demand availability of computer system resources, such as data storage and computing power. In some examples, the cloud 130 provides resources without active management by the user 105. The term cloud is sometimes used to describe data centers available to many users over the Internet. Some large cloud networks have functions distributed over multiple locations from central servers. A server is designated an edge server if the server has a direct or close connection to a user. In some cases, a cloud 130 is limited to a single organization. In other examples, the cloud 130 is available to many organizations. In an example, a cloud 130 includes a multilayer communications network comprising multiple edge routers and core routers. In another example, a cloud 130 is based on a local collection of switches in a single physical location.

In various embodiments, the functions of the summarization system 120 is located on or performed by the user device 110. Product information and other resources for item summarization is stored on one or more databases 140, where the databases 140 are accessed over the cloud 130. User device 110 is a personal computer, laptop computer, mainframe computer, palmtop computer, personal assistant, mobile device, smart hub, or any other suitable processing apparatus. In various embodiments, a user device includes software that incorporates a summarization application. In some examples, the summarization application on a user device includes functions of the summarization system 120.

In various embodiments, a user interface enables the user 105 to interact with the user device 110. In some embodiments, the user interface includes an audio device, such as an external speaker system, an external display device such as a display screen, and/or an input device (e.g., remote control device interfaced with the user interface directly or through an I/O controller module). In various embodiments, a user interface is a graphical user interface (GUI) or an automatic speech recognition application. In various embodiments, a user interface is represented in code which is sent to the user device and rendered locally by a browser or made audible using a speaker.

In various embodiments, a summarization system 120 can include a computer implemented network comprising a user interface, a machine learning model (MLM), which can include a natural language processing (NLP) model, a large language model (LLM), and an automatic speech recognition (ASR) model. The summarization system 120 can also include a processor unit, a memory unit, a search component, a transformer/encoder, and a training component. The training component is used to train one or more machine learning models, including a pre-trained LLM. Additionally, the summarization system 120 communicates with a database 140 via cloud 130. In some cases, the architecture of the neural network is also referred to as a network or a network model. The neural network model can be trained to list and summarize features of one or more items based on a user query using a neural network training technique. The neural network model can be trained to generate questions for the user based on the user query and the search results.

In various embodiments, a transformer/encoder generates a vector representing the description converted from the user's natural language text or voice input. The description can include text or spoken words indicating features of an item to be searched for by a search component.

In various embodiments, the summarization system 120 is implemented on a server. A server provides one or more functions to users linked by way of one or more networks. In some cases, the server can include a single microprocessor board, which includes a microprocessor responsible for controlling aspects of the server. In some cases, a server uses on or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) are used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

A database 140 is an organized collection of data, where for example, database 140 can store data in a specified format known as a schema. Database 140 is structured as a single database, a distributed database, multiple distributed databases, or an emergency backup database. In some cases, a database controller manages data storage and processing in database 140. In some cases, a user 105 interacts with the database controller. In other cases, a database controller operates automatically without user interaction.

Figure 2:
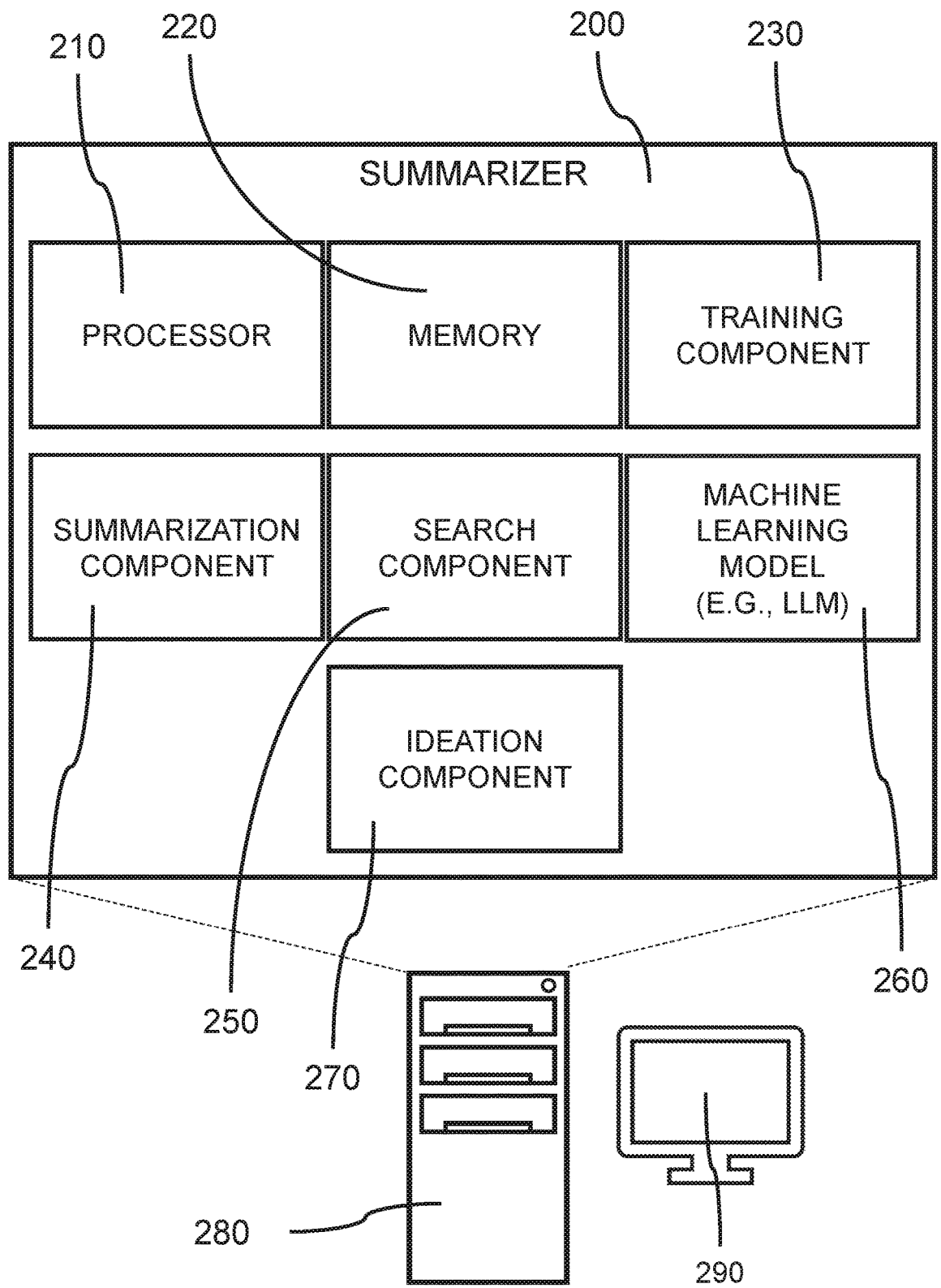
FIG. 2 a block diagram of an example of a summarizer, according to aspects of the present disclosure.

FIG. 2 a block diagram of an example of a summarizer, according to aspects of the present disclosure.

In various embodiments, a summarizer 200 receives a user query requesting information on an item, where the query can be a natural language query. The large language model 260, summarization component 240, ideation component 270, and search component 250 is stored in computer memory 220 of the summarizer 200. The summarizer 200 includes a summarization component and an ideation component that provides users with the ability to generate comparisons and fine tune the way products are compared and summarized to provide different insights that would be useful to the user. The ideation is driven by the trained LLM. The summarizer 200 can be used for online searches, and used specifically for product searches and sale of goods. The summarizer 200 can be utilized for enterprise-to-enterprise engagement.

In various embodiments, the summarizer 200 includes a computer system 280 including one or more processors 210, computer memory 220, a search component 250, a summarization component 240, an ideation component 240, a training component 230, and a large language model 260. The computer system 280 of the summarizer 200 can be operatively coupled to a display device 290 (e.g., computer screen) for presenting prompts and images to a user 105, and operatively coupled to input devices to receive input from the user, including the original query.

In various embodiments, the summarizer 200 is implemented by the summarization system 120 to provide ideation, search refinement, and search result summarization to a user 105.

According to some aspects, a processor 210 comprise one or more processors. Processor 210 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor 210 is configured to operate a memory array using a memory controller. In other cases, a memory controller is integrated into the processor 210. In some cases, processor 210 is configured to execute computer-readable instructions stored in a memory 220 to perform various functions. In some embodiments, processor 210 includes special-purpose components for modem processing, baseband processing, digital signal processing, or transmission processing. Processor 210 is an example of, or includes aspects of, the processor described with reference to FIG. 12.

According to some aspects, memory unit 220 comprise a memory coupled to and in communication with the one or more processors, where the memory includes instructions executable by the one or more processors to perform operations. Examples of memory unit 220 include random access memory (RAM), read-only memory (ROM), or a hard disk. Examples of memory unit 220 include solid-state memory and a hard disk drive. In some examples, memory unit 220 is used to store computer-readable, computer-executable software including instructions that, when executed, cause a processor to perform various functions described herein. In some cases, memory unit 220 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 220 store information in the form of a logical state. Memory unit 220 is an example of, or includes aspects of, the memory subsystem described with reference to FIG. 11.

In various embodiments, the summarizer 200 uses analysis of the user's actions and preferences for identification of salient topics over time via a topic modeling approach (parametric or nonparametric) to guide the large language model (LLM) 260 driven ideation/question-answering system to generate new ideas and determine what the user desires, where the desires can be characteristics and features in a product. The summarizer 200 can monitor the user queries over time and employ a topic modeling technique to identify salient topics over time. These topics are then used to seed an LLM 260 that is used to probe the user (e.g., user) for additional information related to the context of the search, as well as the salient topics of the time period. Topic modeling is a natural language processing (NLP) technique that helps identify common themes or subjects in large text datasets. Weights for a topic indicate the percent (%) of questions generated for each topic, for example, 10% of questions are generated for a "combination/compatibility rules" topic.

According to some aspects, summarization component 240 performs information summarization using a computational model that determines what the user desires in a product. The ideation component 270 identifies words, phrases and topics, and utilizes the large language model LLM 260 to generate questions that are presented to the user to obtain additional information for the search and summarization. Large language model 260 can utilize NLP to generate text that presents the desired information and comparisons to the user. Two separate LLMs are used for summarization and ideation, respectively.

In various embodiments, the summarization component 240 provides relevant search result lists, where the process can hold a significant influence over subsequent user actions and choices. The summarization component 240 can be user behavior driven and optionally merchant KPI (key performance indicators) driven, for example, identified enterprise goals and metrics. The summarization component 240 can be tuned to present a summarization of product results retrieved for the user's search query. The search results are followed by a set of questions generated by the ideation component 270 to ideate further using generative models. The summarization component 240 can be tuned by focusing the generated summaries on user specified parameters such as: product similarity, differentiability, usability, style, price, etc. The summarization component 240 can be tuned through personalization as a function of industry vertical, and user segment/profile. The function of industry vertical is a term that encompasses the type of industry, e.g., retail, manufacturing, consumer good supplier, where for example, B2B language is different from consumer descriptions. B2B language uses a lower-level description including greater technical details compared to a higher level description used for consumer descriptions. Consumer priorities and interests can be different from manufacturer and wholesaler priorities and interests. Questions focusing on obtaining additional information about the user's intentions can be generated by the ideation component 270 utilizing the LLM 260. The summarization can be tuned to include topics learned from the user.

Differentiability can identify and discriminate between different features and different products having the different characteristics (e.g., what the product is; small, portable, cotton, green, etc.) and features (e.g., what the product has or can do: sports mode, water repellant, blue-light blocking, etc.) based on user preferences (e.g., user focused), for example, a user can prioritize safety features over price. Differentiability is different from a generic comparison of features (i.e., what features a product has or doesn't have) because the system learns user specific preferences and user prioritized characteristics and features, for example, the user's favorite color is red. The system also speaks a different language depending on the user, e.g., technical terms versus beginner adaption. The system can learn from an interaction between the user and the product, e.g., user level, and be inferred from user search terms and user search history. The system then generates a prompt based on the history (prompt engineering).

In various embodiments, the large language model 260 performs natural language processing (NLP) to analyze a query received from a user, and provide a search result list generated by the summarization component 240. The large language model 260 is trained and used to interpret the user query and identify one or more items containing features and characteristics of interest to and/or requested by the user.

In various embodiments, the search component 250 can be a browser that includes a search engine that searches online resources based on the user query, and employ the large language model to refine the search based on an analysis of the user query. The summarization component 240 generates a summary list and summarization of information for items and their features discovered by the search using a machine learning model. The summary list and summarization of information is generated and provided to the user by the summarization component 240 from the information obtained by the search component 250.

In various embodiments, the training component 230 is configured to train the models for the summarization component 240, the ideation component 270, and the large language model 260.

In various embodiments, the summarization component 240 is a deep neural network model that can be trained and used to generate item lists and information summarization that correlate with the user query. The large language model 260 can be a transformer model including an encoder and decoder, that can be trained to analyze the user query and uncover the user's potential needs and feature priorities. The large language model 260 can be trained to generate and select ideation questions.

In various embodiments, the item lists and information summarization are presented to the user on the display device 290 (e.g., screen).

Figure 3:
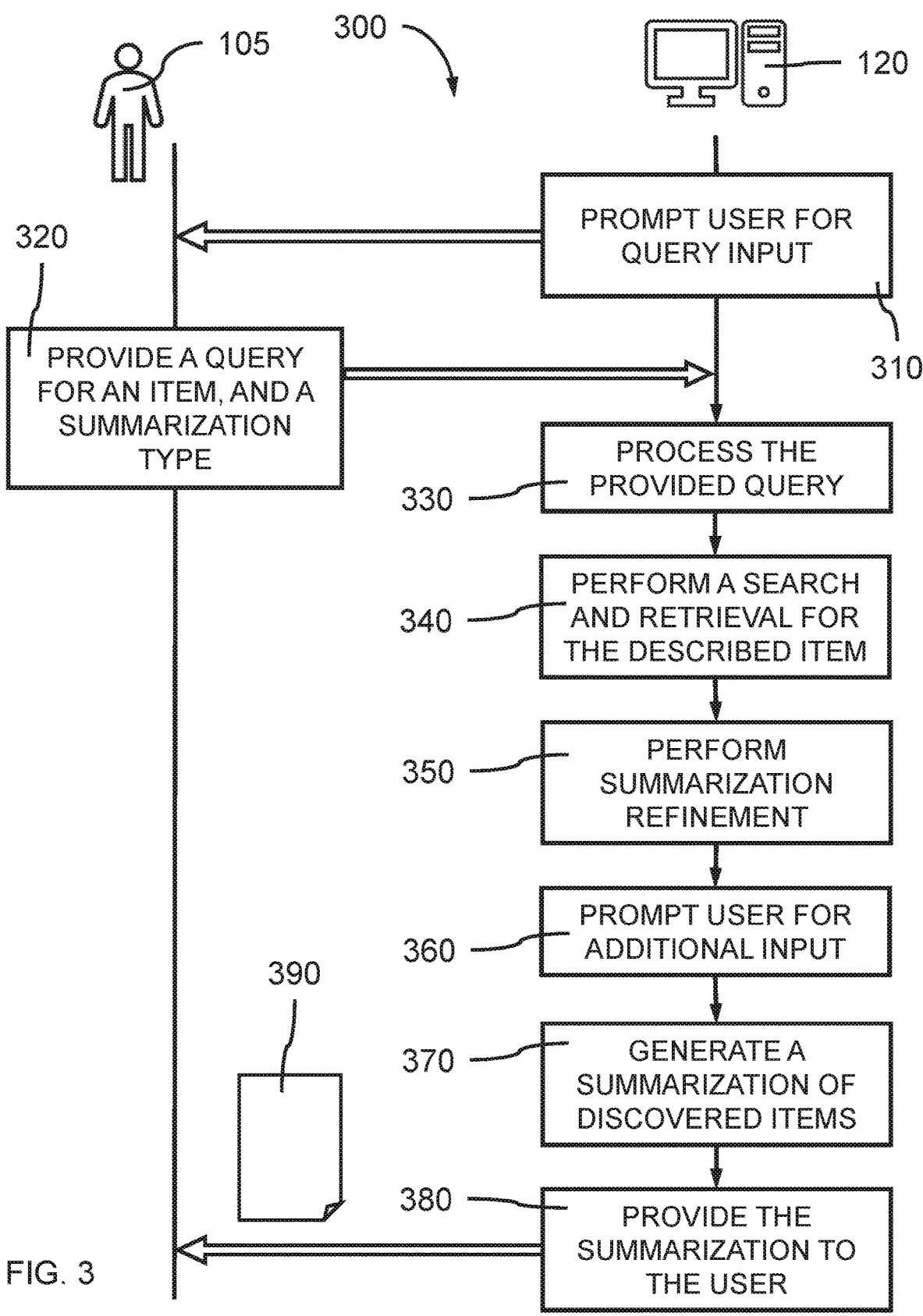
FIG. 3 shows a flow diagram illustrating an example of item summarization using a summarizer system and methods, according to aspects of the present disclosure.

FIG. 3 shows a flow diagram illustrating an example of item summarization using a summarizer system and methods, according to aspects of the present disclosure.

In various embodiments, systems and methods including a highly tunable summarization of product results retrieved for a search query followed by a set of questions to ideate further using generative models is provided.

At operation 310, a summarization system 120 can prompt a user to provide a search query, where the search query can be a natural language query.

At operation 320, a user can provide a query regarding an item of interest to the summarization system 120, where the query can be a natural language query for identifying items of interest to the user 105. The natural language query can be text and vocabulary formatted as a user would speak, write, or otherwise use normally. The user can provide a summarization type that indicates the user's preference of an emphasis on item similarities or item differences in the summarization. The summarization type can include a compression parameter to adjust the conciseness of the generated summarization. The generated summarization can be a comparative summarization that suppresses repeated information in the descriptions and accentuates the similarities and differences between the items.

In various embodiments, a user can provide a name or information regarding an item of interest to the summarization system 120 through the query, where the information can be communicated from the user 105 to the summarization system 120.

At operation 330, the summarization system 120 can obtain the query and summarization type from the user, where the query includes features and/or characteristics of an item of interest, where the item and description details are available on a database 140. The machine learning model 260, for example, a large language model (LLM), parses and analyzes the query to obtain information and context regarding the user's intent and interest. The query is processed using a large language model to identify search terms.

The item a user is searching for can fall within a product category, where one or more manufactures provide a product that falls within the product category of the item. The products provided by different manufacturers and suppliers have different features that can also affect how the product can be used (also referred to a usability differences), for example, different rider lawnmowers have different features that affect the incline and/or rough terrain that are managed due to the machine's size, weight and balance, or categories of mountain bikes handle different terrain.

At operation 340, a search can be performed for the item identified in the query, where the search component 250 (e.g., browser/search engine) can use the analyzed query for the search. One or more products that meet the criteria of the search and fall with the product category are found by the search. Information relating to the found products based on the searched item can be retrieved, where the information can describe a plurality of characteristics, features, and uses. Input data is generated for a machine learning model (e.g., LLM) based on the descriptions and the summarization type.

At operation 350, identified items and descriptions can be associated with relevant portions (e.g., search terms) of the original query, and associated with user identified topic(s). The input data is provided to the machine learning model of the summarization component 240. The search is based on the query to identify items relevant to the search terms. The summarization component 240 associates identified products and descriptions with details in the user's query based on the user's intent. The summarization component 240 is trained to identify products based on manufacturer and provider descriptions. The summarization component 240 determines what feature(s) in the product descriptions are related and relevant to the details present in the user query.

At operation 350, the system performs selective summarization by accepting one or more product selections from the user (e.g., user). The summarization system 120 can perform summarization refinement utilizing the summarization component 240, which provides a more sophisticated way of summarizing descriptions, and can supplement a summarization with new information that was not originally available and narrow the categories of information provided to a user. The summarization system 120 and summarization component 240 additionally accepts the summarization type that may include a compression parameter to control the conciseness of the generated summarization. The compression parameter is a machine learning model (e.g., LLM) parameter that can be tuned to specify how much the summarization should be summarized, e.g., number of tokens, words, or sentences used to generate the summary.

In various embodiments, the summarization component 240 of the summarization system 120 models a creativity/diversification score that controls the summarization's creativity and diversity as a function of the user's segment, industry, enterprise model, etc.

At operation 360, the summarization system 120 prompts the user 105 for additional input to refine the search and the results. The summarization system 120 utilizes the ideation component 270 and LLM 260 to generate follow-up questions for a subsequent search query that enables the user to ideate and find more information. For example, the initial search based on the user's original query identifies products within a product category, and also informs the user of applicable terms used in the search space for characteristics and features of interest to the user, as well as additional concepts relating to the product category, that the user was not initially aware of. This can allow the user to generate new ideas (i.e., ideation) about the format and wording of a subsequent query.

In various embodiments, summarization refinement by the summarization component 240 and question generation by the ideation component 270 includes a conversation between the summarization system 120 and the user 105 to capture the user's intentions and new considerations to clarify the search. For example, the initial results identify a top K set of items that match the initial query, and the ideation component 270 asks the user 105 for the user's intended use of the item or which feature is most important to the user. The ideation component 270 generates questions to ask the user 105 using the machine learning model 260. The ideation component 270 then prompts the user 105 with alternative query wording for the subsequent search, which can narrow down and focus on the user's preferences and intended use. Follow-up questions can introduce new keywords for search queries, for example, "sports watch", "water resistance", or "full-calendar" for a search for a watch.

In various embodiments, to ensure factual correctness of the generated summarization in the context of the search result list, a contrastive learning approach is leveraged to train the summarization model of the summarization component 240 in an online setting on positive and negative summaries to reduce contrastive loss. Contrastive loss takes the output of the network for a positive example and calculates its distance to an example of the same class and contrasts that with the distance to negative examples. The contrastive learning approach can involve learning vector embeddings by contrasting between similar and dissimilar samples. The loss is lower if positive samples are encoded to similar (closer) representations and negative examples are encoded to different (farther) representations. This is done by taking in a batch of search sessions, constructing positive and negative summary samples in each iteration, and taking a gradient step towards minimizing the contrastive loss. The positive and negative sets are constructed by the model by incorporating a reward function that accounts for factual correctness, such as a QUALS (QUestion Answering with Language model score for Summarization) Model for question-answering. The QUALS Model can generate factually accurate text summaries.

In various embodiments, the user is presented with a set of follow-up questions for further ideations and refinement. The questions generation task is construed as a question-answering problem, where a question generation LLM is presented with the search summary and with additional contexts pertaining to multiple widely distributed ideation topics such as 1) product focused; 2) session focused; 3) promotion and combination/compatibility rules; 4) facets/guided navigation, and so on. The intent is to generate questions for the user to answer, where the generated questions address each of the topic definitions to cover diverse user information needs.

At operation 370, the summarization component 240 of the summarizer 200 prepares an item list and summarization 390 for the products to be presented to the user 105. Based on a user selection of the summarization type, the summarization system 120 invokes the appropriate submodular objective, which encourages the summarization to be representative of product similarities, or which encourages and positively rewards product differences. The summarization type indicates and applies an emphasis on item similarities or item differences. The summarization system 120 additionally orchestrates the prompts to the summarization machine learning model to highlight product similarities or differences in the search results. The summarization of the descriptions based on the input data in response to the query, wherein the summarization emphasizes the item similarities or item differences based on the summarization type, is generated using a machine learning model 260 (e.g., LLM).

Because product variations can be nuanced, a comparative summarization aids the user in focusing on the right products quickly. At other times, a user wants a summarization that highlights similar product features, for example, in some scenarios, a summarization of product similarities could help the user understand if their high-level search intent was interpreted correctly by the search engine of a search component 250. The generated summarization can be a comparative summarization that suppresses repeated information in the descriptions to highlight the similarities and differences between the items.

At operation 380, the item list and summarization 390 is provided to the user 105 by communicating the item list and summarization 390 from the summarization system 120 to the user device 110.

Figure 4:
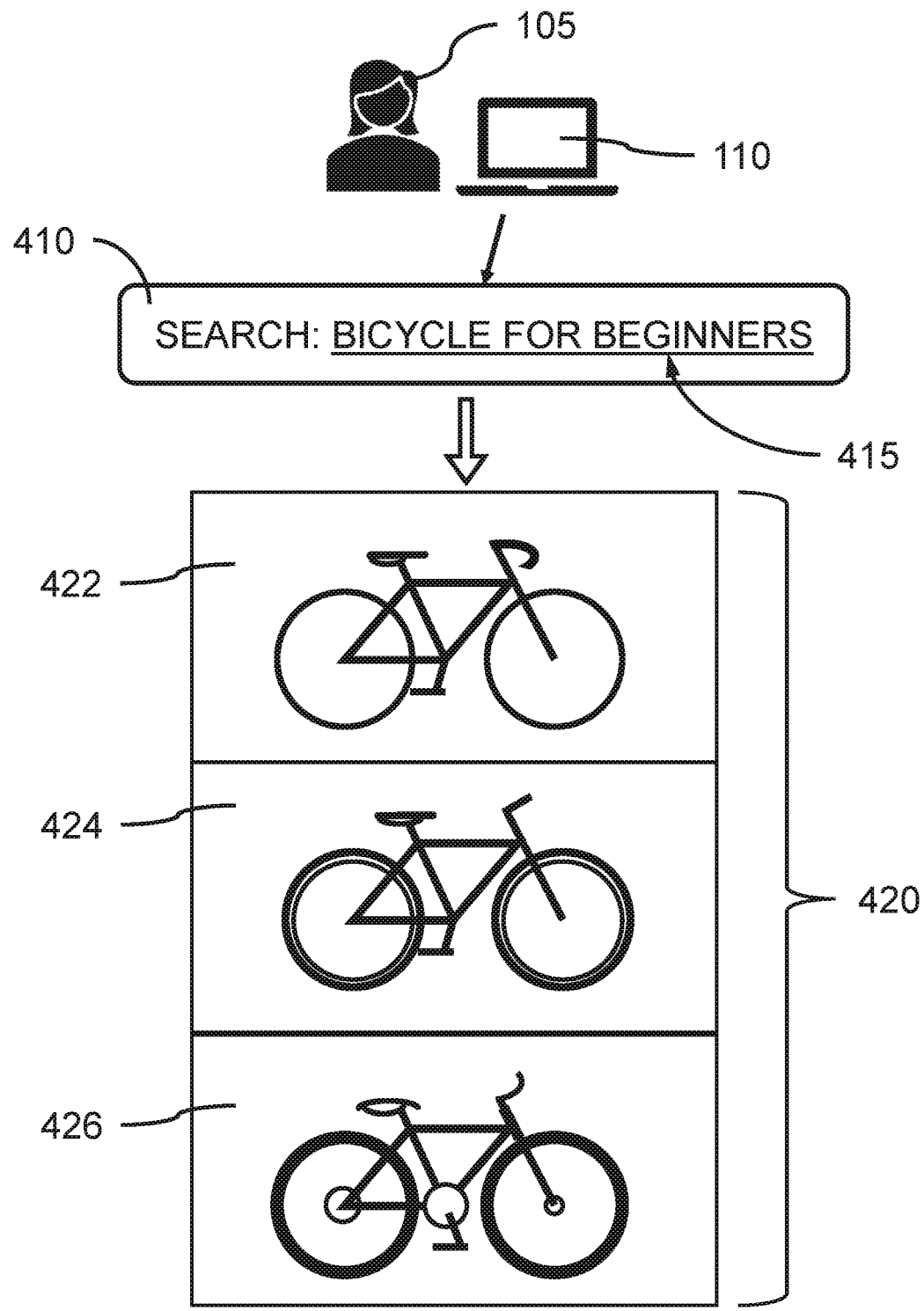
FIG. 4 shows a flow diagram of a method for generating search results, according to aspects of the present disclosure.

FIG. 4 shows a flow diagram of a method for generating search results, according to aspects of the present disclosure.

In various embodiments, a user 105 can input a search query 410 to a user device 110, where the search query 410 can be a textual, natural language search for an item 415 of interest to the user 105. The query 410 can include one or more terms that encompass a product and a descriptor, for example, the product can be a "bicycle", and the descriptor can be "for beginners", where the descriptor can be used to filter the search results 420. The query 410 can be provided to the search component 250, where the search component 250 is a browser with a search engine. In another example, the search query 410 can be, "mountain bike for beginners", where the product is still "bicycle", but the descriptor has changed to include "mountain" as well as "beginner". The addition of "mountain" has thereby changed the context of the search.

In various embodiments, the search query 410 is analyzed by a machine learning model 260 (e.g., LLM) prior to performing the search by the browser. The large language model 260 can parse the query 410 to determine an intention behind a user's query, where the determination can be the accurate understanding of the query based on the proximity to other terms and phrases in the vector space of the trained LLM based on the vector embeddings. The search query 410 can be modified by the LLM the from the user's initial search query 410 to more accurately capture this intention by incorporating or substituting other terms that are proximal to the original query terms, where the substituted terms are based on the proximity in the vector space between words.

In various embodiments, the effective presentation of desired products to the user 105 is based on understanding the significance of the user's query intention, which can drive user engagement. The strategic arrangement of products and the presentation of their features enhances the user experience and increases the probability of the user making a selection. The LLM 260 parses the query 410 to provide a more refined understanding of the user's precise need and/or intended use for a product.

In various embodiments, the modified search query is provided to the search component 250 for the item search, which would be conducted online.

In various embodiments, the search component 250 returns a plurality of search results 420 that include a plurality of items (e.g., products) 422, 424, 426 that meet the search criteria. The summarization system 200 is a trained LLM model that provides a summarization of the descriptions located for the products 422, 424, 426, which can include summarization of the product similarities and product differences (e.g., price, features, sizes, storage capacity, availability, etc.), and product usability and limitations (e.g., use environments (e.g., indoor/outdoor, hot/cold weather, hilly/flat, dry-clean/machine-washable, etc.). A clear summarization and comparison of these aspects of the products 422, 424, 426 allows the user 105 to identify the product meeting the user's criteria, which can increase the likelihood of a selection decision. For example, a first identified product 422 is described by a manufacturer or supplier as an "introductory" bicycle for "novice hobbyists", whereas a second identified product 424 is described as "a comfortable bicycle for amateur cross-country bikers", and a third product 426 is described as "a good introductory bicycle for mountain biking". While each product description includes key words indicative of being for beginners, the context of each description varies between "novices", "cross-country bikers", and "mountain biking". Each of the products would be expected to have feature differences that would make them usable for different types of biking, where the user uses such feature differences to compare and differentiate the search results 420.

In various embodiments, the summarization is fine-tuned as a function of parameters, including explicit, user-specified parameters. The summarizer 200 analyzes the query history to identify salient topics over time through a topic modeling approach (e.g., parametric or nonparametric) to guide an LLM driven ideation and question-answering system. The summarization can be tuned to include topics learned from the user based on the ideation and question-answering.

In various embodiments, the summarizer 200 of the summarization system 120 monitors user queries 410 over time and employs a topic modeling technique to identify salient topics over time. These topics are then used to seed the LLM 260 that is used to request additional information related to the context of the user's search, in addition to the salient topics of the period. The summarization can be based on topics learned from the user.

In various embodiments, the LLM 260 generates ideation questions for the user 105 to answer, such as, "what terrain do you intend to use the bicycle on?" The answers provided by the user can assist in developing a subsequent query that captures the intended use and utilizes more accurate terms. For example, "all-terrain" may be a more accurate term that describes the kind of bike used for "mountain biking". The user can select one or more ideation questions from a plurality of ideation questions to further refine a search space.

In various embodiments, for each identified product, the terms directly relating to the type of use can be included in the generated summarization.

In various embodiments, the NLP is a transformer type natural language processor/neural language model (e.g., GPT), an encoder based natural language processor (e.g., Bidirectional Encoder Representations from Transformers (BERT), Robustly Optimized BERT (ROBERTa)), or other encoder/decoder based NLP.

In various embodiments, an automatic method can be used to extract a condensed version of the relevant information from the query. GPT3 can be used to analyze the query for each item search, where the query is analyzed using a large language model (LLM) to identify search terms. A final query can be generated, and each processed by GPT3 independently.

A transformer or transformer network is a type of neural network model used for natural language processing tasks. A transformer network transforms one sequence into another sequence using an encoder and a decoder. Encoders and decoders include modules that can be stacked on top of each other multiple times. The modules comprise multi-head attention and feed forward layers. The inputs and outputs (e.g., target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes an attention mechanism, where the attention looks at an input sequence and decides at each step which other parts of the sequence are important.

The attention mechanism involves query, keys, and values denoted by Q, K, and V, respectively. Q is a matrix that contains the query (vector representation of one word in the sequence), K represents all the keys (vector representations of all the words in the sequence), and V is the values, which is the vector representations of all the words in the sequence. For the encoder and decoder, multi-head attention modules, V consists of the same word sequence as Q. However, for the attention module that is taking into account the encoder and the decoder sequences, V is different from the sequence represented by Q. In some cases, values in V are multiplied and summed with some attention-weights, a.

Figure 5:
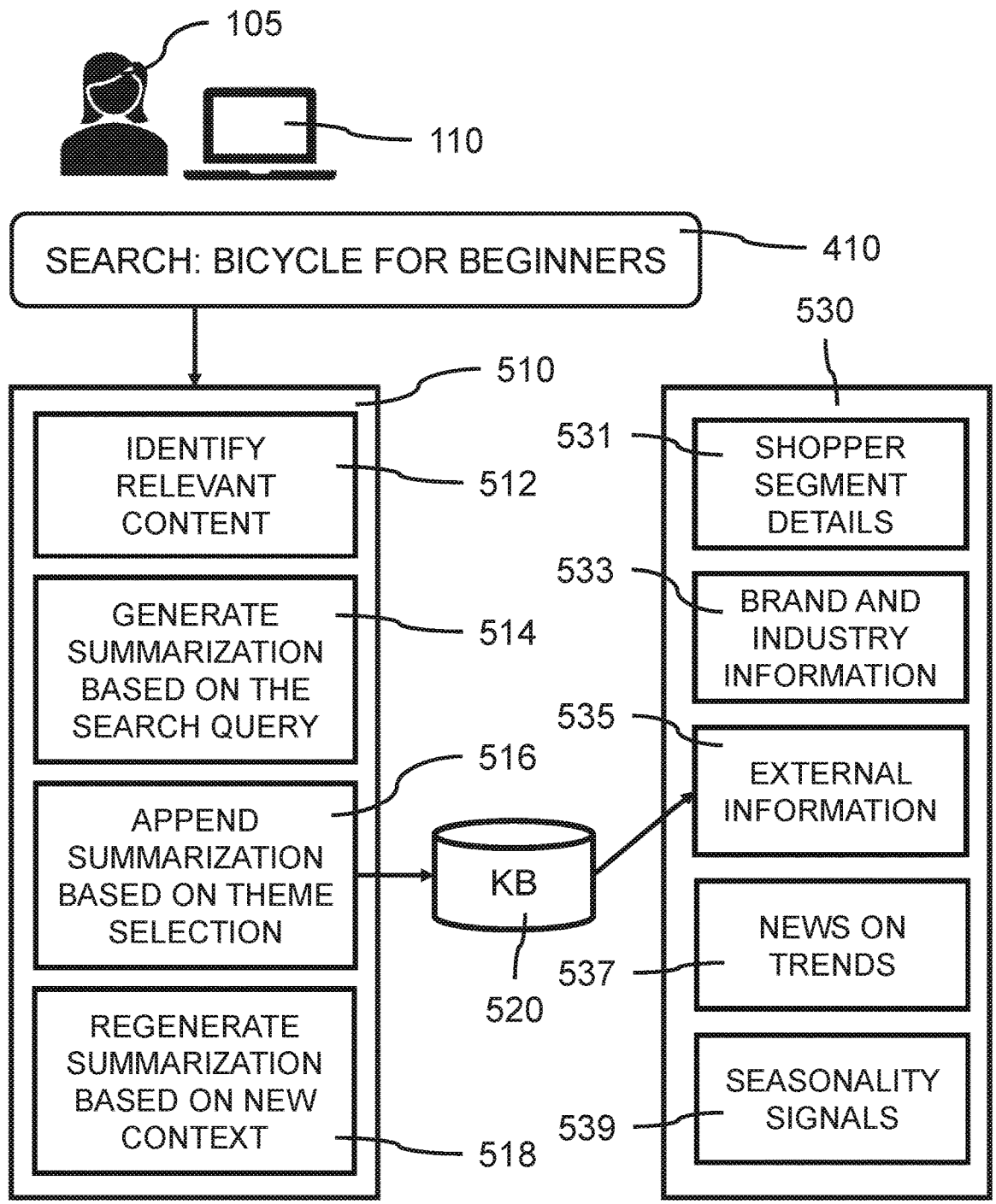
FIG. 5 shows a block/flow diagram illustrating an example of a method of search result summarization, according to aspects of the present disclosure.

FIG. 5 shows a block/flow diagram illustrating an example of a method of search result summarization, according to aspects of the present disclosure.

In various embodiments, the user 105 inputs a search query 410 into the user device 110, where the search query 410 is a natural language query. The summarization system 120 receives the search query 410 from the user device 110, where the search query 410 requests an online search for an item relevant to a description in the query, and the summarization system 120 performs a search result summarization 510. A search component 250 (e.g., browser) of the summarizer 200 performs an online search for products that relate to the description and context of the query 410 and the summarization component 240 extracts the relevant details from the descriptions retrieved for the products in the search result 420. The search result 420 is organized as entries in a result-set.

In various embodiments, the summarization system 120 obtains a ranked list of products as a result of the search query 410 from the search component 250, which are placed in the result set, where the search result 420 can be an ordered set. The content of the result-set is then aggregated and provided as an input to the summarization component 240 of the summarization system 120. This includes the aggregated search content of the top-k results of the search.

In various embodiments, a submodular set function is applied to the aggregated result-set to identify highly topically relevant sentences in the product descriptions that capture a maximum of information for the entries in the result-set. The number of products, k, is defined based on an arbitrary relevance threshold. The optimized content from the top-k results is presented along with the search query 410, as a question-answering problem, to the LLM 260 of the summarization system 120 to form an initial summary of the search results 420.

In various embodiments, the submodular set function is an optimization technique that describes the relationship between a set of inputs and an output. An optimization problem that involves optimizing a convex or concave function can be reframed as a problem of maximizing or minimizing a submodular function subject to some constraints. The submodular set function condenses information in the product descriptions (e.g., web page descriptions) and product documents (e.g., sales literature, user manuals, etc.) into a subset containing maximum information. A vector set function looks for dissimilarity in vectors.

In various embodiments, the sentences making up the product descriptions and product documents that are identified as containing more information are extracted from the product descriptions and documents based on the submodular set function. A trained model of the summarization component 240 is used to identify the information and perform the data compression.

In a non-limiting example, aggregation of the search results, for example, extracts three (3) lines of information that provides a maximum amount of product information from the multiple-line product description for each of the top-k search results. The number of sentences/lines extracted can be determined by a compression parameter: e.g., 3 sentence. This is done by obtaining the most different key words from the search result, while eliminating redundant information to capture relevant product information that focuses on facts.

In various embodiments, the initial summary of the search results 420 is communicated to the user device 110 and presented to the user 105.

At operation 512, the summarizer 200 identifies the relevant content in the product descriptions and documents using the trained summarization component 240. An evaluation is done using a natural language processor model of the LLM 260.

At operation 514, the trained summarization component 240 generates a summarization for each product identified in the result set by extracting and aggregating the most relevant information. The summarization is based on the search query 410, where the terms of the query are used to identify the relevant information. The summarization results are tuned based on various factors.

At operation 516, the summarization is appended based on a theme selection, where the user identifies one or more themes to be applied. The search results are summarized in a manner that would highlight what the user is looking for based on the theme selection.

In various embodiments, the user 105 is presented theme options to tune the summary towards specific areas of interest, such as fashion trends in specific geo-locations, seasonal trends, product usage, etc. Based on the theme selection by the user, a biasing context is queried from data sources stored in a knowledge base (KB) 520, such as user segment details 531, brand and industry vertical details 533, news feeds 537 on similar products that are trending, and seasonality signals 539 to generate a biasing context. For example, a user may be interested in understanding product usage better through summarization. In such a scenario, the biasing context is queried from data sources such as instruction manuals of products in the merchant's knowledge base 520. The summarization component 240 focuses on the selected themes.

Seasonality Signals include context such as, it's getting cold, so it's fall, so change activities.

An industry vertical is a grouping of users by industry to offer products and services that meet industry specific needs, which can be viewed as a type of product segment. Industry vertical details is a term used to represent a type of industry, e.g., retail, manufacturing, consumer good supplier, e.g., professional language is different from consumer descriptions.

In various embodiments, the theme selection is an interface presented to the user 105 on the user device 110 with different themes, which allows the user (e.g., user) to customize comparisons to particular preferences (e.g., trends). The selection of a theme focuses summarization on different topics and contexts delimiting the user's interests, e.g., gifts for a wedding, gifts for a birthday, women's summer clothing, auto accessories, etc. What are trending birthday gifts in a location, return products that meet that theme. Theme selection incorporates external information into the product search query 410 by the search component 240. For example, for a wedding in Mexico, a user would be expected to be looking for a warmer theme considering external knowledge about the location and weather. The summarization system 120 incorporates that information into the summarization, as part of the iterative process. Theme selection is not about how the information is visually displayed to the user.

In various embodiments, the biasing context is presented back to the summarization model of the summarizer component 240 along with the initial summarization to re-generate a new summarization.

At operation 518, the summarization is regenerated based on the new context, where the LLM 260 of the summarization system 120 generates the new, tuned summarization. The summarization system 120 then presents the new, tuned summarization to the user 105 through the product display page. The new, tuned summarization replaces the initially generated summarization.

Figure 6:
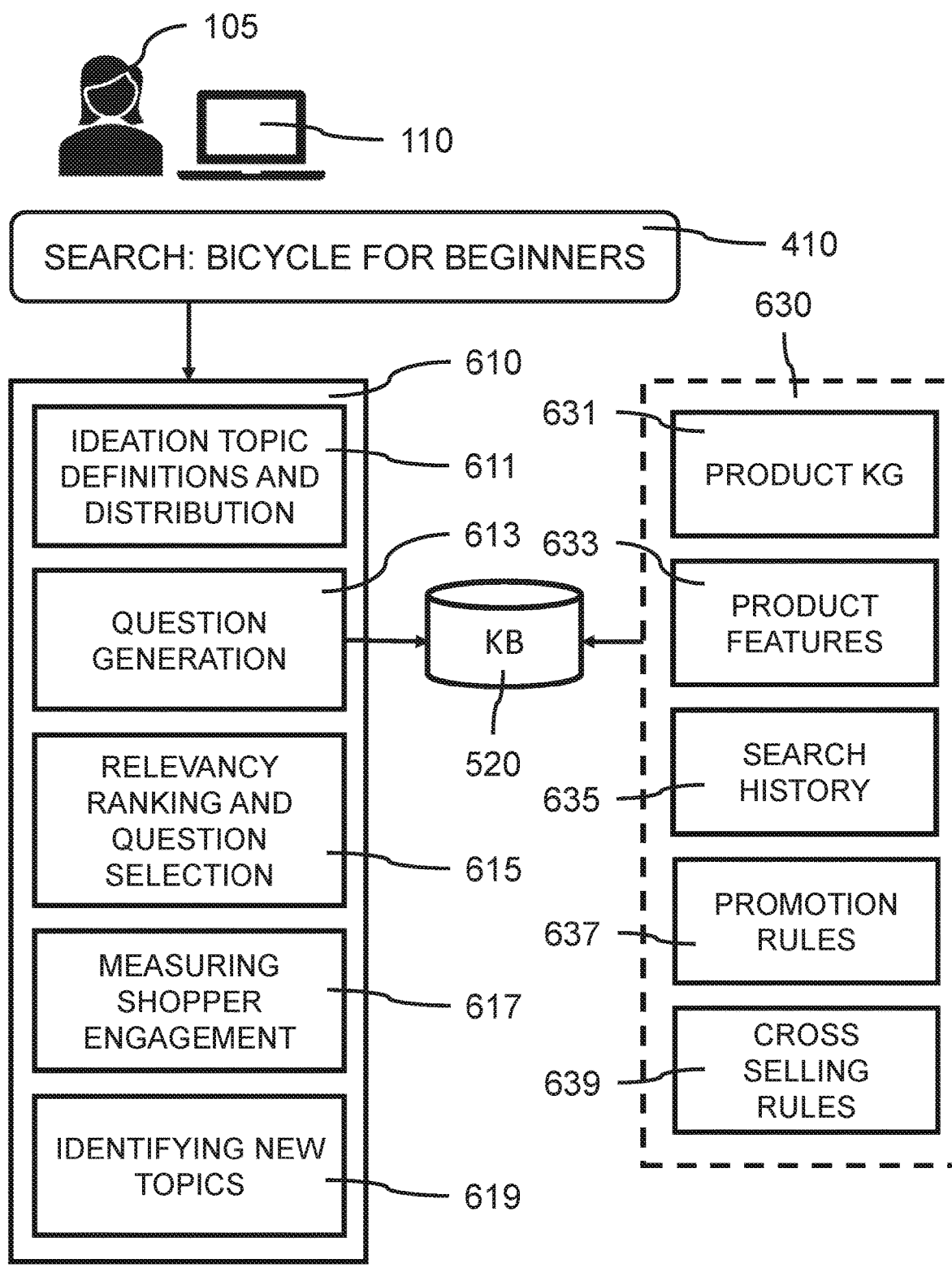
FIG. 6 shows a block/flow diagram of a method of ideation question generation, according to aspects of the present disclosure.

FIG. 6 shows a block/flow diagram of a method of ideation question generation, according to aspects of the present disclosure.

In various embodiments, the user 105 inputs a search query 410 into the user device 110, where the search query 410 is a natural language query. The summarization system 120 receives the search query 410 from the user device 110, where the search query 410 is utilized for an online search for an item relevant to a description in the query 410, and the summarization system 120 performs ideation question generation 610. A search component 250 of the summarizer 200 performs the online search of products that relate to the description and context of the query 410, and the summarization component 240 extracts the relevant details from the descriptions of the products in the search result 420.

In various embodiments, the summarization system 120 obtains a ranked list of products as a result of the search query 410 from the search component 250 that form a result set. The descriptive content for the entries (e.g., items) in the result set is then aggregated and provided as an input to the summarization component 240 of the summarization system 120.

In various embodiments, a submodular set function is applied to the aggregated result set to identify highly topically relevant sentences that captures a maximum of information for each of the entries in the result set. The number of products, k, is defined based on an arbitrary relevance threshold, where the relevance threshold is a score at which the search results are cut off. The relevance threshold score is calculated from the actual search results based on the descriptive content for each of the entries. The relevance threshold score is utilized to reduce the number of entries in the result set considered for summary.

In various embodiments, the optimized content from the top-k results, determined subsequent to reduction in the number of entries in the result set, is presented along with the search query 410 as a question-answering problem to the LLM 260 of the summarization system 120 to form an initial summary of the search results 420.

At times, a user 105 suppresses repeated information in the search results to highlight significant product differences, for example, product variations are nuanced and thus a comparative summarization based on similarities and differences between the items aids the user in narrowing down the products quickly. At other times, the user 105 wants a summarization that highlights similar product features, for example, for users, a summarization of product similarities could help the user understand if their high-level search intent was interpreted correctly by the search engine of the search component 250. The summarization type indicates and applies an emphasis on item similarities or item differences. Based on the selection of a summarization type, the system invokes an appropriate submodular objective, which encourages the summarization to be representative of product similarities, or which positively rewards a summarization of product differences. The summarizer 200 additionally orchestrates the prompts to the summarization model to highlight and accentuate product similarities and/or differences in the search results 420. Personalized summaries with biasing context from diverse sources are presented to the user 105. The summarization model of the summarization component 240 is trained based on supervised contrastive learning, where the summarization model is a machine learning model.

In various embodiments, the summarization component 240 of the summarization system 120 performs selective summarization by accepting one or more product selections from the user 105. The summarization component 240 additionally accepts a compression parameter from the user 105 to control the conciseness of the generated summarization, where the compression parameter indicates the number of tokens, words, or sentences used to generate the summary of each item in the top-k results. The summarization component 240 models utilize a creativity/diversification score that controls the summarization's creativity and diversity, as a function of the user segment, industry, the enterprise model, etc. The summarization is regenerated based on tuned parameters like diversity, creativity, and other learned attributes from catalog context and merchant vertical/industry.

At operation 611, the ideation component 270 of the summarizer 200 obtains topic definitions, where a "topic" refers to a specific subject or category, for example, product details, sessions, promotions, etc., for example, "green sweaters", "seasonal sale", "cordless", etc, and a distribution of the different topics. Questions are generated based on these topics and the distribution to meet the users' diverse information needs that may span a multitude of product types. The ideation component 270 of the summarization system 120 adapts the question distribution based on user preferences and identifies new topics, as the user asks additional questions beyond the predefined ones. The questions and answers can be analyzed by the pretrained LLM 260, where the LLM 260 uses the query as input to prompt the generation of new questions. Previous search results and predefined topics are also input to the ideation component 270 and LLM 260. The ideation component 270 and LLM 260 identify new search topics including new keywords for a subsequent search query.

In various embodiments, ideation topics include, product focused, session focused, promotion and combination/compatibility rules, facets/guided navigation, etc.

Users have a propensity to exhibit varying levels of interest in ideation topics based on parameters such as industry verticals, enterprise models, product types, item needs, and so on. For example, questions generated for a "promotion and combination/compatibility rules" topic generates higher engagement in some websites compared to other websites, whereas "filtering/guided navigation" type questions generate more interest in stores that provide electronics. By learning a user's affinity to the ideation topics over time, a multi-armed bandit based online learning approach optimizes the distribution of questions over the ideation topics over time presented to the user by presenting more questions of the optimal topics and less of the sub-optimal topics to improve a reward metric defined, for example, as user clicks, conversions, thumbs-up/thumbs-down rating system for questions exposed to the user. New topics are identified from questions generated by the user outside of the presented ideation topics and are leveraged to continually optimize the search space for topics.

The multi-armed bandit based online learning approach is based on the problem in which a fixed, limited set of resources are allocated between competing alternative choices in a way that maximizes the expected gain. The objective is to maximize the sum of earned rewards. In the learning setting, the reward metric is the user clicks, conversions, thumbs-up/thumbs-down rating, etc., and the limited set of resources is the set of questions focused on the ideation topics presented to the user. The multi-armed bandit based approach is used to identify the topics, the distribution of the topics, and the questions generated based on learned user affinity to improve a reward metric.

In various embodiments, both parametric and non-parametric variations of such a question generation system are used. In a parametric system, the ideation topics are predefined and enhanced over time, in the non-parametric system, the summarization system 200 dynamically models topics by analyzing historical search patterns. In response to being presented with the ideation questions, the user can select from the questions to further refine/filter their search space. Based on the question selected, the search results are updated, which invokes the summarization component 240 to re-generate the search results summary and present additional follow-up questions in real-time. The query filter used to refine the search space and query would also be saved as a component of the user's search history 635 for future question generation and search/summary refinements.

At operation 613, the ideation component 270 of the summarizer 200 generates follow-up questions for a subsequent search query to enable the user 105 to ideate and find more information. The follow-up questions are generated by the ideation component 270 utilizing the LLM 260, and the user 105 is presented with the set of diverse follow-up questions for further ideations. The ideation involves the ideation component 270 generating multiple widely distributed ideation topics, where ideation involves the creative process of generating, developing, and communicating new ideas. The diversification of topics to cover diverse user information needs, that span a multitude of product types, provide ideas for the user to apply to the subsequent search queries, including different keywords, context descriptions, and industry-specific feature descriptions. The range of topics is based on an initial distribution, that can be refined. The questions generation task is construed as a question-answering problem, where a question generation LLM is presented with the previous search summary and with additional contexts pertaining to multiple widely distributed ideation topics such as 1. product focused, 2. session focused, 3. promotion and combination/compatibility rules 4. facets/guided navigation and so on. Questions that address each of the topic definitions are generated by the ideation component 270 using the LLM 260 to cover diverse user 105 information needs.

In various embodiments, the summarization system 120 can access a knowledge base (KB) 520, where the knowledge base (KB) 520 is a database storing detailed descriptions of a plurality of products available from a merchant, as well as information about the user search history 635, and promotion and sales rules 637, 639.

At operation 615, the questions generated by the LLM 260 are ranked by the ideation component 270 based on relevancy, where relevancy is indicated by a relevancy score. Relevancy scores are calculated and applied based on the previous search results, where for example, the model is trained to identify the top 10 questions based on the calculated topic distribution using the multi-armed bandit approach. The ideation question model of the ideation component 270 learns to identify an appropriate relevancy score, and uses the relevancy score to sort, rank, and exclude generated follow-up questions. The relevancy score is calculated based on the maximized expected gain. Use of the relevancy score reduces the number of follow-up questions presented to the user 105. The most relevant questions are selected to be presented to the user. The ideation component utilizes the multi-armed bandit approach to identify the plurality of generated ideation questions for presentation to the user from a larger set of generated ideation questions. The user can select one or more ideation questions from the plurality of generated ideation questions to further refine a search space.

At operation 617, the summarization system 120 measures the user's (e.g., user's) engagement, where the engagement is a measurement of the number of items examined by (e.g., clicked on) the user, as well as the number of repeat visits to a website to examiner products, and the duration the user spends on the website examining products. This information can be obtained by the and stored by the search component 250 in memory 220. In addition, the number of questions, answers, refining of the query, searching of similar products, checking out other topics represented by the search component 250 model, and the duration of this interaction process could be proxy for engagement. The topic distribution presented to the user is updated based on the user's engagement based on online learning.

At operation 619, the search component 250 identifies new topics for the user using the LLM 260, where the new topics are identified based on proximity to the search terms and context of the query previously analyzed by the LLM 260. New topics are identified from questions generated by the user 105 outside of the presented ideation topics, and are leveraged to continually optimize the search space. This is performed in an iterative manner to update topics and topic/question distributions. Both parametric and non-parametric variations of such a system are used. In parametric variations, the ideation topics are predefined and enhanced over time, in the non-parametric variations, the system dynamically models topics by analyzing historical search patterns by the user 105. Predefined and dynamic topic models are offered to the user 105 for flexibility.

In various embodiments, the new topics identified from the user are used to update the topic definitions for a next iteration of the search and summarization. A new query generated based on the responses provided by the user to the generated ideation questions, and a subsequent search is conducted using the new query.

In various embodiments, the knowledge base (KB) 520 is a database storing detailed descriptions of a plurality of products available from the merchant. The knowledge base (KB) 520 includes data to generate search session context, including a product knowledge graph (PKG) 631, product features 633, user search history 635, promotion rules 637, and/or combination/compatibility rules 639.

In various embodiments, the product knowledge graph 631 is a structured data representation that connects products, attributes, and relationships. The PKG enables efficient product discovery, personalization, and navigation for users, to enhance their shopping experience.

In various embodiments, the product features 633 describe aspects of the particular product, and can be unique for each of one or more products provided by the merchant.

In various embodiments, the search history 635 includes each search query 410 made by the user 105 within a specified time period, where the time period can be user specified or predetermined by the summarization system 120.

In various embodiments, the promotion rules 637 include rules applied to product sales promotions to increase the perceived value of a product. Sales promotion policy can include guidelines for determining when a sales promotion is appropriate. Federal and state consumer regulations that apply to sales promotion policy are outlined and provisions that apply to the enterprises and are relevant to each of the particular products are stored as promotion rules 637 in the KB 520. Promotion rules define a set of criteria that a customer must meet, for example, by adding products to their cart and completing their order, to be eligible to receive the promotional incentive. An example question is: "What are the deals on Aluminum Mountain bikes?"

In various embodiments, the combination/compatibility rules 639 include rules applied to identifying related or complementary products to a customer. Combination/compatibility rules 639 are the practice of identifying additional products to existing users based on the customer's interests. The combination/compatibility rules 639 identify related products and services suitable for combination/compatibility. Combination/compatibility rules involves providing related, supplementary products or services based on the customer's interest in, or obtaining of, one of your company's products. An example question is: "Are you interested in exploring our bike gear?"

In various embodiments, guided navigation includes, for example, filters displayed on the left or top side of a website to help the user narrow down their search. An example question is: "Are you looking for something in the trail bikes category?"

Figure 7:
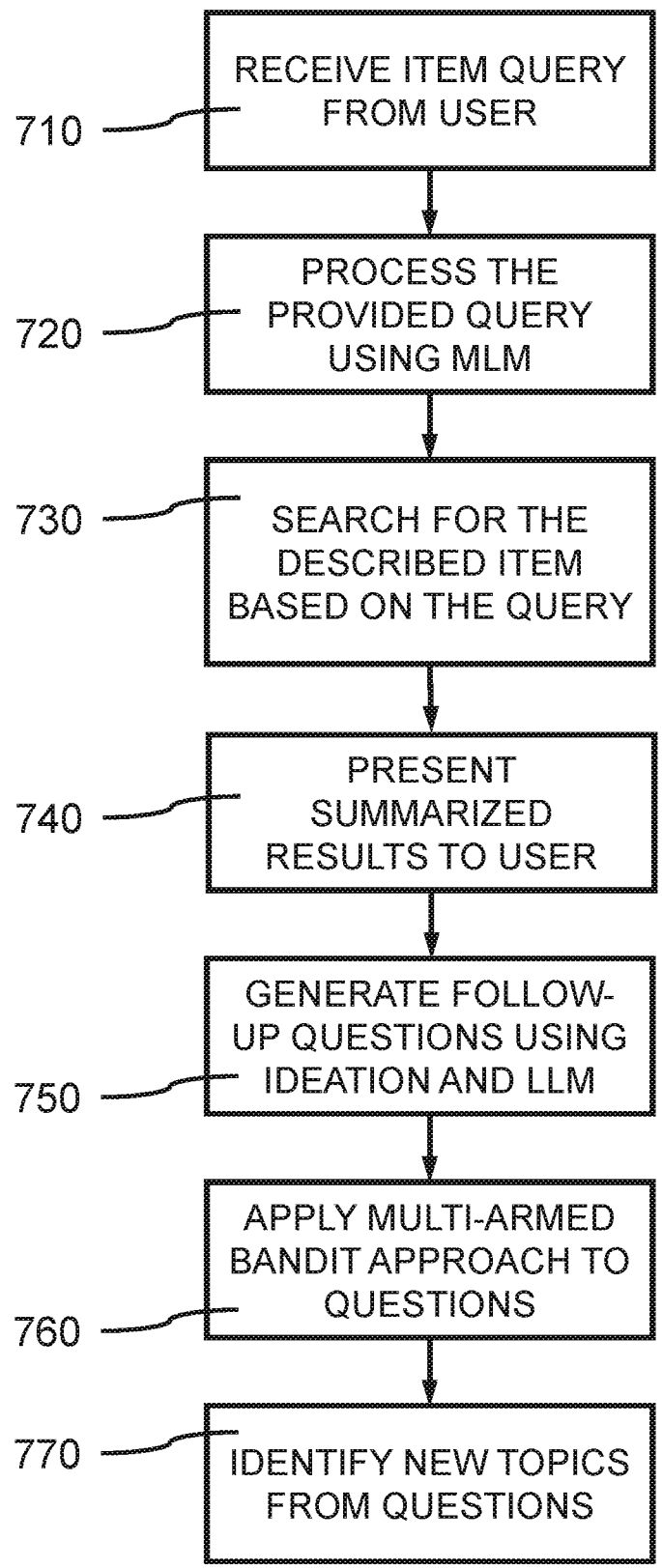
FIG. 7 shows a flow diagram of a method of user engagement for search result summarization, according to aspects of the present disclosure.

FIG. 7 shows a flow diagram of a method of user engagement for search result summarization, according to aspects of the present disclosure.

At operation 710, the summarization system 120 receives a query from a user device. The query can include a plurality of words in a natural language format, that can be interpreted by the machine learning model (MLM) 260 (e.g., LLM), as a search for an item of interest to the user. The summarization system 120 can receive a summarization type from the user device.

At operation 720, the query provided by the user is processed by the MLM 260 to identify the item of interest, key words relating to the item, and context terms for the description. The MLM 260 generates a search query utilized by a search component 250 (e.g., browser) of the summarizer 200 to conduct an online and/or offline product search depending on the accessibility of the information relating to the item. The query provided by the user is processed by the MLM 260 to determine the intensions of the user 105, where a pretrained LLM can be utilize to determine the user intensions.

At operation 730, the search for the item identified in the query is conducted by the search component 250. The items are searched for based on the item description in the search query utilized by the search component 250, and a ranked list of items with associated descriptions identified. The items identified by the search are summarized by the summarization component 240 using the MLM 260 based on the descriptions and a summarization type, and presented to the user. Comparative summaries are generated for each of the identified items from the obtained descriptions based on the summarization type.

At operation 740, the summarized results based on the descriptions obtained for the items identified by the search are presented to the user.

At operation 750, follow-up questions are generated by the ideation component 270 using the MLM 260, where the follow-up questions include ideas about the search context and item not in the original query. The MLM 260 is pretrained to generate questions. The follow-up questions are for a subsequent search query to enable the user 105 to ideate and find more information that was not obtained in the previous search.

At operation 760, a multi-armed bandit approach is applied to the generated questions. A subset of ideation questions is identified based on topics determined to be of interest to the user to improve user engagement. The ideation component 270 utilizes the multi-armed bandit approach to identify a subset of generated ideation questions for presentation to the user from a larger set of generated ideation questions.

At operation 770, new topics are identified by the user from the selected questions. In response to being presented with the ideation questions, the user can select from the questions to further refine/filter their search space. The user's search can be repeated with a refined search query that focuses on the relevant topics. The new topics are used for a subsequent search query in an iterative approach.

Figure 8:
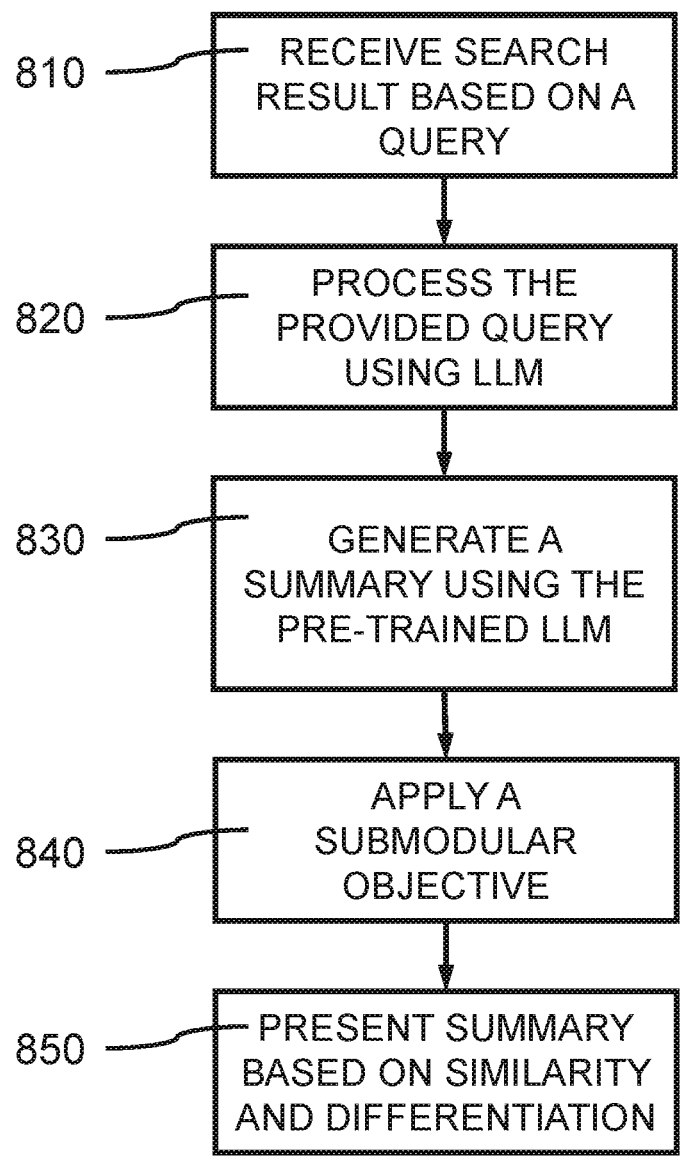
FIG. 8 shows a flow diagram of an example of a method of training a summarization model, according to aspects of the present disclosure.

FIG. 8 shows a flow diagram of an example of a method of training a summarization model, according to aspects of the present disclosure.

In various embodiments, a pre-trained LLM is used for both summarization and ideations. The LLM is pre-trained in an unsupervised way using a large corpus of textual data. The LLM 260 includes a question-answering model.

At operation 810, a query relating to an item and a summarization type indicating an emphasis on item similarities or item differences can be received by a summarizer 200 of a summarization system 120. A summarization component 240 and pre-trained MLM 260 receive the query and search results, including a list of items and associated item information. Descriptions of items relevant to the query are obtained using a search component 250.

In various embodiments, the MLM 260 is a pretrained LLM, that is refined using a contrastive learning approach to enhance factual correctness.

At operation 820, the query and search results are processed using the MLM 260, and a summarization is generated for the query. The summarization can be a contrastive summarization based on a summarization type.

In various embodiments, the LLM is retrained using a loss function that encourages the LLM to generate summaries similar to the positive samples in a training dataset and discourages the LLM from generating summaries similar to the negative samples.

At operation 830, a summary is generated by the pre-trained LLM 260.

In various embodiments, the loss value can be calculated based on a loss function, where the loss function is selected based on efficient convergence of the LLM model.

At operation 840, the loss is calculated using a submodular objective that encourages the pre-trained LLM to generate summaries with a vector embedding closer to the positive samples in the training dataset and farther from the negative samples. The submodular objective encourages the summarization to be representative of product similarities, or which positively rewards product differences. The supervised contrastive learning approach is employed to improve factual correctness of the summaries generated by the pre-trained LLM model. A loss value may not be calculated for the generated summary and dataset summary using the contrastive loss.

Contrastive loss takes the output of the pre-trained LLM network for a positive example and calculates the distance to an example of the same class in the training data, and contrasts that distance with the distance to negative examples. The loss is low if positive examples are encoded to similar (closer) representations and negative examples are encoded to different (farther) representations. This can reduce the contrastive loss. The supervised contrastive learning approach is employed to improve factual correctness of the summaries generated by the pre-trained LLM model.

At operation 850, the summarization capturing similarities and differences between the listed items is output. The summary based on the similarities and difference is presented to a user.

Figure 9:
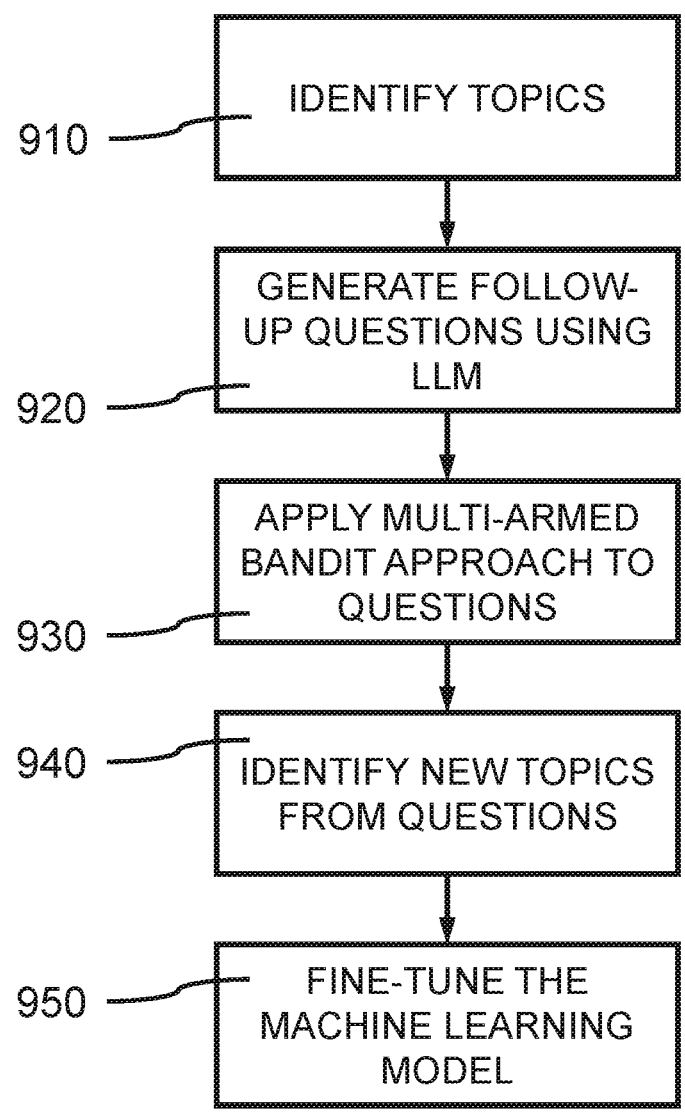
FIG. 9 shows a flow diagram of a method of training a Question and Answer (Q&A) LLM for ideation, according to aspects of the present disclosure.

FIG. 9 shows a flow diagram of a method of training a Question and Answer (Q&A) LLM for ideation, according to aspects of the present disclosure.

In various embodiments, two separate pre-trained LLM models may be subsequently trained, where a first LLM model may be trained for ideation and question generation, and a second LLM model may be trained for summarization. The pre-trained LLM may be pretrained to generate questions, where the pretrained LLM can have a transformer architecture. The pre-trained LLMs may receive a training topic.

In various embodiments, a pre-trained LLM for a question-answering model is utilized for ideation workflow, where Q&A LLM is used to generate new topics. The ideation can be based on a probabilistic model that generates new words in response to user input. The ideation model may be parameterized or non-parameterized, where a parameterized ideation model can include predefined topics, as a form of classification, and a non-parameterized ideation model can learn through user interactions with the model and reinforcement learning.

At operation 910, the pre-trained LLM including a question-answering model (Q&A LLM) identifies topics and an associated distribution percent (%) to generate follow-up questions. Training data may not be used to train the question-answering model, instead a foundational training query may be utilized as training input to prompt initial question generation. A parametrized and/or non-parametrized workflow is used to retrain a pre-trained LLM 260 including the question-answering model. In various embodiments, in the parametrized workflow, the Q&A LLM is provided with predefined topics and an associated distribution percent (%) to generate follow-up questions, whereas in the non-parametrized workflow, the summarization system 120 identifies topics and associated distribution percent (%) from historical search patterns using a topic modeling approach, where the historical search patterns may be generated by the user.

In various embodiments, the question-answering model can utilize a knowledge base (KB) 520 to generate prompts for the user.

At operation 920, a set of follow-up questions are generated by the ideation component 270 using the Q&A LLM based on the identified distribution of topics. The generated questions move away from the previous query.

At operation 930, a multi-armed bandit online learning technique is employed to reward identified topics that generate more user engagement and penalize topics that generate less engagement. Relevancy ranking is used to generate a list of candidate questions having a determined distribution of topics. The most relevant questions are selected based on a calculated relevancy score, and presented to the user 105.

In this approach an agent selects actions (topics) in order to maximize its cumulative reward in the long term. In each round of training, the agent receives some information about the current state (e.g., engagement in the form of clicks, duration, purchases, revenue, etc.), then it chooses an action (topic) based on this information and the experience gathered in previous rounds. At the end of each round, the agent receives the reward (user engagement) associated with the chosen action (topic).

In various embodiments, a multi-armed bandit online learning technique is employed to reward topics that generate more user engagement and penalize topics that generate less engagement. In this approach, a user selects actions (topics) in order to maximize its cumulative reward in the long term. In each round, the training component 230 receives some information about the current state (e.g., user engagement in the form of clicks, purchases, revenue, etc.), then it chooses an action (topic) based on this information and the experience gathered in previous rounds. At the end of each round, the training component 230 receives the reward (user engagement) associated with the chosen action (topic).

At operation 940, new topics are identified from the user response to the generated and selected questions.

At operation 950, the last layer of the question-answering model is fine-tuned, where the question-answering model may eliminate words or other terms from proposed questions to the user in order to elicit new ideas from the user. The weights assigned to the topics are tuned over time to generate questions for different topics and with different % distributions.

In various embodiments, the weights of the pretrained LLM 260 are not updated or changed as part of the ideation training. Instead, the last layer of the neural network is fine-tuned for context. A mask layer can be used to eliminate word and/or token options. The ideation words generate by the LLM may be narrowed by eliminating possible responses output by the model. By reducing the available words output by the ideation model, new word options based on the ranked probability can be provided to the user. The weights of the pretrained LLM may not be adjusted to generate new word options.

Figure 10:
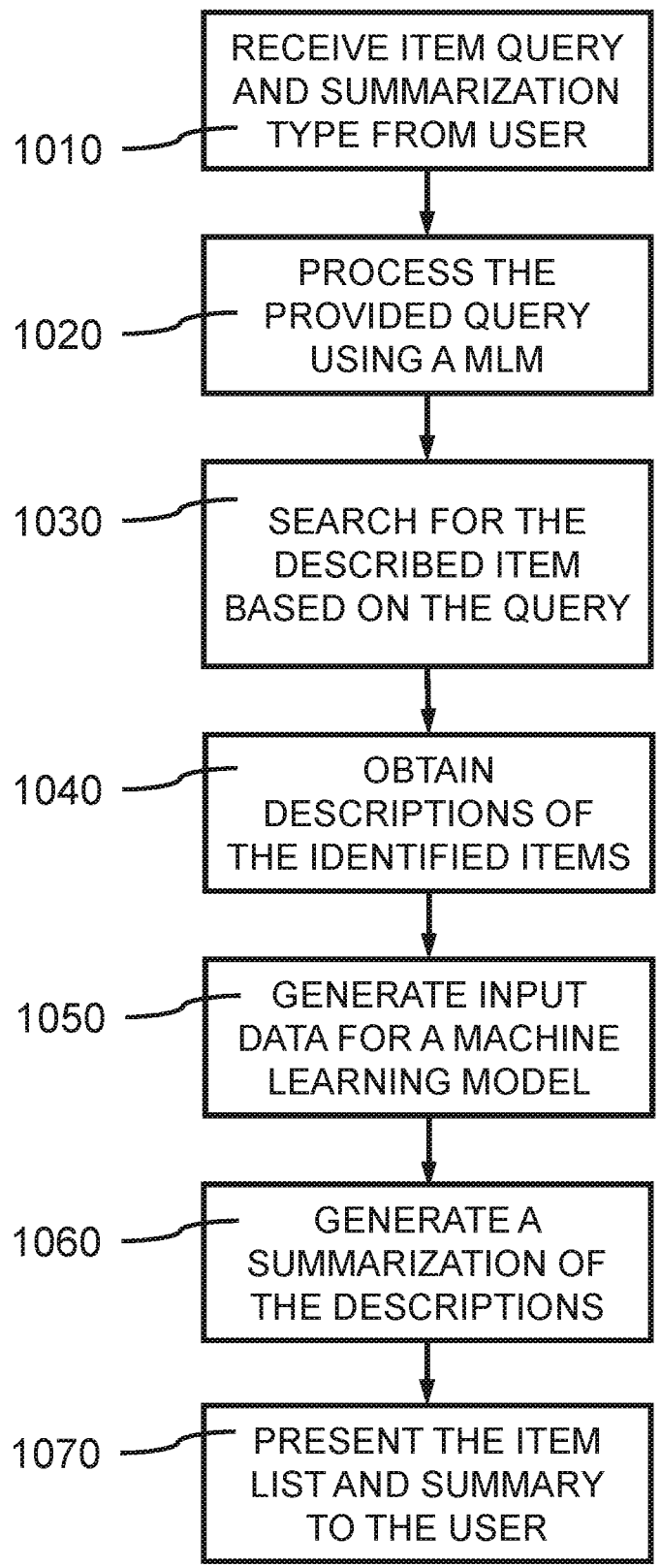
FIG. 10 shows a flow diagram illustrating an example of a method of search result summarization, according to aspects of the present disclosure.

FIG. 10 shows a flow diagram illustrating an example of a method of search result summarization, according to aspects of the present disclosure.

At operation 1010, a summarization system receives a query and a summarization type from a user, where the query and summarization type is communicated from a user device.

At operation 1020, the received query is processed by the summarization system using and MLM (e.g., LLM) to generate a processed query.

At operation 1030, the processed query is used to search for items relevant to the processed query. The search is conducted by a search component of the summarization system.

At operation 1040, one or more items are identified as relevant to the processed query, and descriptions of each of the identified items are obtained. The descriptions can be obtained from websites offering products relevant to the item description in the processed query. The items can be received in a ranked list from a search component as a result of an initial search query.

At operation 1050, input data is generated from the ranked list of items, associated descriptions, processed query, and summarization type. The input data can be configured for the machine learning model to process and identify relevant information from which a summarization can be generated.

At operation 1060, comparative summaries are generated for each of the identified items from the obtained descriptions based on the input data. The comparative summaries are more concise than the obtained descriptions, and highlight item similarities and/or differences between items in the ranked list. The length and formatting of the summaries is based on the summarization type and a compression parameter that determines a conciseness.

At operation 1070, the item list and comparative summary is presented to the user.

In various embodiments, the process can be repeated for multiple iterations using an ideation system involving a machine learning model (e.g., Q&A LLM) to generate new queries for each search iteration. The new queries are based on the ideation questions and summarizations.

Figure 11:
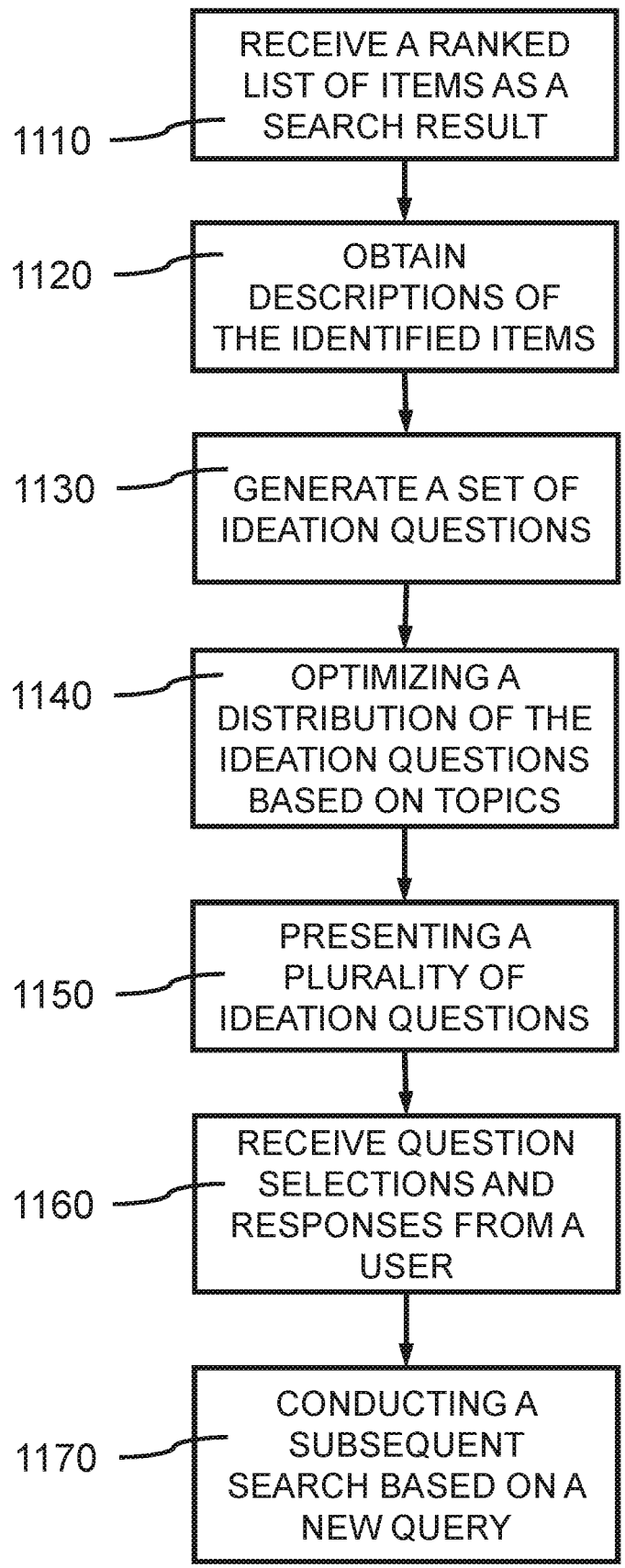
FIG. 11 shows a flow diagram illustrating an example of a method of search result summarization, according to aspects of the present disclosure.

FIG. 11 shows a flow diagram illustrating an example of a method of search result summarization, according to aspects of the present disclosure.

At operation 1110, a ranked list of items can be received by a search component, as a search result based on a query.

At operation 1120, descriptions of the identified items can be obtained.

At operation 1130, a set of ideation questions are generated by an ideation component utilizing a machine learning model. The ideation questions are generated based on the ranked list of products, corresponding descriptions, and the initial search query.

At operation 1140, a distribution of ideation questions is optimized based on a multi-armed bandit approach to identify a subset of generated ideation questions. The ideation component utilizes a multi-armed bandit approach to identify the plurality of generated ideation questions for presentation to the user from a larger set of generated ideation questions based on topics. A mask layer can be used to eliminate word and/or token options for questions generated by the machine learning model to eliminate possible output from the machine learning model. At operation 1150, the subset of ideation questions are presented to the user.

At operation 1160, a user can select to answer one or more of the presented ideation questions. The user's responses to the ideation questions are received by the machine learning model.

At operation 1170, the machine learning model generates a new query based on the answers to the ideation questions, and conducts a subsequent search using the search component based on the new query.

Embodiments of the disclosure can utilize an artificial neural network (ANN), which is a hardware and/or a software component that includes a number of connected nodes (i.e., artificial neurons), which loosely correspond to the neurons in a human brain. Each connection, or edge, transmits a signal from one node to another (like the physical synapses in a brain). When a node receives a signal, the nodes process the signal and then transmits the processed signal to other connected nodes. In some cases, the signals between nodes comprise real numbers, and the output of each node is computed by a function of the sum of the node's inputs. In some examples, nodes determine their output using other mathematical algorithms (e.g., selecting the max from the inputs as the output) or other suitable algorithms for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on the layer's inputs. The initial layer is known as the input layer and the last layer is known as the output layer. In some cases, signals traverse certain layers multiple times.

Embodiments can utilize a word embedding model to encode a text prompt. A word embedding is a learned representation for text where words that have the same meaning have a similar representation. Glove, Word2Vec, GPT, BERT, and CLIP are examples of systems for obtaining a vector representation of words. GloVe is an unsupervised algorithm for training a network using aggregated global word-word co-occurrence statistics from a corpus. Similarly, a Word2vec model can include a shallow neural network trained to reconstruct the linguistic context of words. GloVe and Word2vec models take a large corpus of text and produce a vector space as output. In some cases, the vector space has a large number of dimensions. Each word in the corpus is assigned a vector in the vector space. Word vectors are positioned in the vector space in a manner such that similar words are located nearby in the vector space. In some cases, an embedding space includes syntactic or context information in additional to semantic information for individual words.

Figure 12:
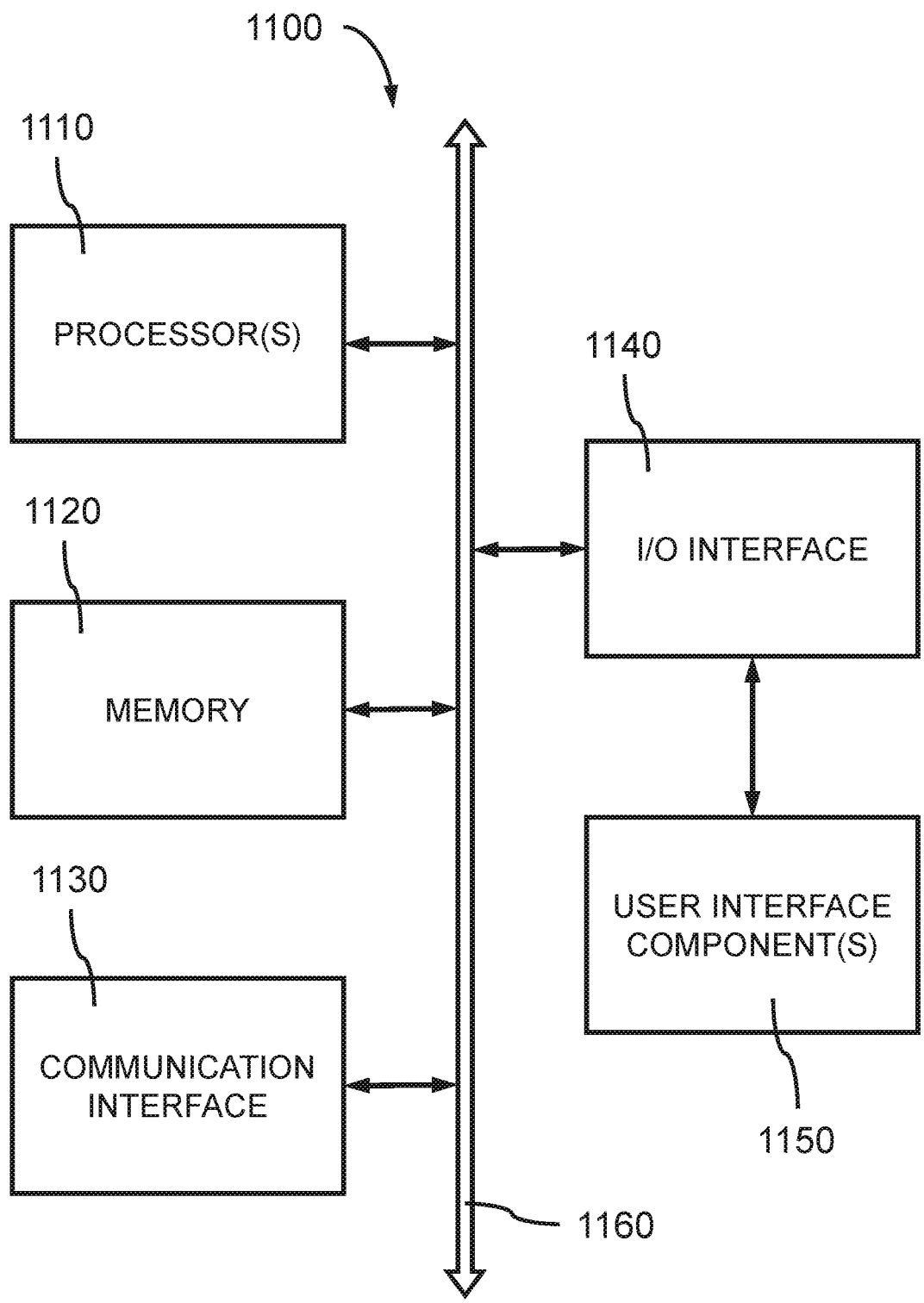
FIG. 12 shows an example of a computing device for a summarization system according to aspects of the present disclosure.

FIG. 12 shows an example of a computing device for a summarization system according to aspects of the present disclosure.

In various embodiments, the computing device 1200 includes processor(s) 1210, memory subsystem 1220, communication interface 1230, I/O interface 1240, user interface component(s) 1250, and channel 1260.

In various embodiments, computing device 1200 is an example of, or includes aspects of summarization system 120. In some embodiments, computing device 1200 includes one or more processors 1210 that can execute instructions stored in memory subsystem 1220 for model training.

In various embodiments, computing device 1200 includes one or more processors 1210. In various embodiments, a processor 1210 can be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1210 is configured to operate a memory array using a memory controller. In other cases, a memory controller is integrated into a processor. In some cases, a processor is configured to execute computer-readable instructions stored in a memory to perform various functions. In some embodiments, a processor 1210 includes special-purpose components for modem processing, baseband processing, digital signal processing, or transmission processing.

A processor 1210 can be implemented as a combination of computing devices (e.g., a combination of a DSP and a microprocessor, multiple microprocessors, one or more microprocessors in conjunction with a DSP core, or any other such configuration). Thus, the functions described herein are implemented in hardware or software and executed by a processor, firmware, or any combination thereof. If implemented in software executed by a processor 1210, the functions are stored in the form of instructions or code on a computer-readable medium.

In various embodiments, memory subsystem 1220 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor 1110 to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1230 operates at a boundary between communicating entities (such as computing device 1200, one or more user devices, a cloud, and one or more databases) and channel 1260 (e.g., bus), and can record and process communications. In some cases, communication interface 1230 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1240 is controlled by an I/O controller to manage input and output signals for computing device 1200. In some cases, I/O interface 1240 manages peripherals not integrated into computing device 1200. In some cases, I/O interface 1240 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component, including, but not limited to, a modem, a keyboard, a mouse, a touchscreen, or a similar device. In some cases, the I/O controller is implemented as a component of a processor. In some cases, a user interacts with a device via I/O interface 1240 or via hardware components controlled by the I/O controller.

According to some aspects, user interface component(s) 1250 enable a user to interact with computing device 1200 and summarizer 200. In some cases, user interface component(s) 1250 include an audio device, such as an external speaker system, an external display device such as a display device 290 (e.g., screen), an input device (e.g., a remote-control device interfaced with a user interface directly or through the I/O controller), or a combination thereof. In some cases, user interface component(s) 1250 include a GUI.

Computer-readable media includes both non-transitory computer storage media and communication media including any medium that facilitates transfer of code or data. A non-transitory storage medium is any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components are properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

The description and drawings described herein represent example configurations and do not represent all the implementations within the scope of the claims. For example, the operations and steps can be rearranged, combined or otherwise modified. Also, structures and devices are represented in the form of block diagrams to represent the relationship between components and avoid obscuring the described concepts. Similar components or features have the same name but have different reference numbers corresponding to different figures.

Some modifications to the disclosure are readily apparent to those skilled in the art, and the principles defined herein can be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" would be based on both condition A and condition B. In other words, the phrase "based on" shall be construed to mean "based at least in part on." Also, the words "a" or "an" indicate "at least one."

What is claimed is:

1. A method comprising:
   receiving a query relating to an item and a summarization type indicating an emphasis on item similarities or item differences;
   obtaining, using a search component, descriptions of items relevant to the query;
   generating input data for a machine learning model based on the descriptions and the summarization type; and
   generating, using the machine learning model, a summarization of the descriptions based on the input data in response to the query, wherein the summarization emphasizes the item similarities or the item differences based on the summarization type.

2. The method of claim 1, further comprising:
   tuning the summarization to include topics learned from a user.

3. The method of claim 1, further comprising:
   processing the query using the machine learning model to identify search terms; and
   conducting a search based on the query to identify items relevant to the search terms, wherein descriptions associated with the items are used by the machine learning model to generate questions for a user.

4. The method of claim 1, wherein:
   the generated summarization is a comparative summarization that suppresses repeated information in the descriptions and accentuates similarities and differences between the items.

5. The method of claim 1, wherein:
   generating follow-up questions for a user using the machine learning model to identify new search topics.

6. The method of claim 5, further comprising:
   conducting a subsequent search based on the new search topics.

7. The method of claim 1, wherein:
   a conciseness of the summarization of the descriptions is based on a compression parameter that determines.

8. A method, comprising:
   receiving a ranked list of items from a search component as a result of an initial search query;
   presenting a plurality of ideation questions generated by a machine learning model to a user, wherein the plurality of ideation questions are generated based on the ranked list of items and the initial search query; and
   conducting, using the search component, a subsequent search using a new query generated by the machine learning model based on responses provided by the user to the generated ideation questions.

9. The method of claim 8, wherein:
   the user selects one or more ideation questions from the plurality of ideation questions to further refine a search space.

10. The method of claim 8, wherein:
    the plurality of ideation questions are generated based on topics identified by the user through the responses provided by the user.

11. The method of claim 8, further comprising:
    optimizing a distribution of the plurality of generated ideation questions using a multiarmed bandit approach.

12. The method of claim 8, further comprising:
    identifying topics from the responses provided by the user to the plurality of generated ideation questions; and
    incorporating the identified topics into the new query.

13. The method of claim 12, further comprising:
    conducting the subsequent search using the new query generated based on the identified topics.

14. The method of claim 8, further comprising:
    aggregating descriptive content for the ranked list of items; and
    providing the aggregated descriptive content to a summarization component as an input to generate the ideation questions.

15. A system comprising:
one or more processors;
one or more memories including instructions executable by the one or more processors to:
receive an initial search query relating to an item and a summarization type indicating an emphasis on item similarities or item differences;
obtain, using a search component, a ranked list of items, as a result of the initial search query;
generate, using a machine learning model, a comparative summarization of descriptions for the ranked list of items based on the summarization type; and
present the comparative summarization and a plurality of generated ideation questions to a user, wherein the plurality of ideation questions are generated by an ideation component based on the ranked list of items and the initial search query.

16. The system of claim 15, wherein:
the machine learning model includes a transformer encoder and a transformer decoder.

17. The system of claim 15, wherein:
the machine learning model is a pre-trained large language model (LLM) configured to generate the comparative summarization of descriptions based on a vector embedding.

18. The system of claim 15, further comprising:
receiving, by the machine learning model, responses to the plurality of ideation questions from the user; and
conducting a subsequent search using a new query generated by the machine learning model based on the responses.

19. The system of claim 18, wherein:
the ideation component utilizes a multi-armed bandit approach to identify the plurality of generated ideation questions for presentation to the user from a larger set of generated ideation questions.

20. The system of claim 19, wherein:
the machine learning model is trained based on supervised contrastive learning.

* * * * *